(12) United States Patent
Fu et al.

(10) Patent No.: US 10,878,097 B2
(45) Date of Patent: Dec. 29, 2020

(54) BIOS FLASHING METHOD AND BIOS IMAGE FILE PROCESSING METHOD

(71) Applicant: Alibaba Group Holding Limited, Grand Cayman (KY)

(72) Inventors: Yingfang Fu, Hangzhou (CN); Peng Xiao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 140 days.

(21) Appl. No.: 16/206,971

(22) Filed: Nov. 30, 2018

(65) Prior Publication Data
US 2019/0188387 A1  Jun. 20, 2019

(30) Foreign Application Priority Data
Oct. 25, 2017  (CN) .......................... 2017 1 1009667

(51) Int. Cl.
| | |
|---|---|
| *G06F 21/57* | (2013.01) |
| *G06F 8/61* | (2018.01) |
| *H04L 9/08* | (2006.01) |
| *H04L 9/30* | (2006.01) |
| *H04L 9/32* | (2006.01) |

(52) U.S. Cl.
CPC .............. *G06F 21/572* (2013.01); *G06F 8/63* (2013.01); *H04L 9/0894* (2013.01); *H04L 9/30* (2013.01); *H04L 9/3268* (2013.01); *G06F 2221/033* (2013.01)

(58) Field of Classification Search
CPC ....... G06F 21/572; H04L 9/0894; H04L 9/30; H04L 9/3268
USPC ............................................................ 713/2
See application file for complete search history.

(56) References Cited

U.S. PATENT DOCUMENTS

| | | |
|---|---|---|
| 6,715,074 B1 | 3/2004 | Chaiken |
| 6,976,163 B1 | 12/2005 | Hind et al. |
| 8,656,146 B2 | 2/2014 | Findeisen et al. |
| 9,053,323 B2 | 6/2015 | Balacheff et al. |
| 9,183,394 B2 | 11/2015 | Henry |
| 9,742,568 B2 | 8/2017 | Rao et al. |
| 10,296,353 B2 | 5/2019 | Liu et al. |
| 2008/0034350 A1 | 2/2008 | Conti |
| 2013/0125107 A1 | 5/2013 | Bandakka et al. |
| 2013/0125244 A1 | 5/2013 | Sugano |
| 2015/0220736 A1 | 8/2015 | Martinez et al. |
| 2016/0055332 A1 | 2/2016 | Jeansonne et al. |

OTHER PUBLICATIONS

The PCT Search Report and Written Opinion dated Mar. 21, 2019 for PCT Application No. PCT/US2018/063482, 10 pages.

*Primary Examiner* — Eleni A Shiferaw
*Assistant Examiner* — Angela R Holmes
(74) *Attorney, Agent, or Firm* — Lee & Hayes, P.C.

(57) ABSTRACT

A BIOS (Basic Input/Output System) flashing method and a BIOS image file processing method, belonging to the field of computers, are provided. The methods include: obtaining a BIOS image file, the BIOS image file carrying a first verification parameter and a first file parameter, verifying that the first verification parameter has validity, verifying that the BIOS image file has completeness based on the first file parameter; and performing BIOS flashing employing the BIOS image file verified as having completeness. The present disclosure may improve security and reliability of data servers.

17 Claims, 14 Drawing Sheets

BIOS FLASHING METHOD AND BIOS IMAGE FILE PROCESSING METHOD

CROSS REFERENCE TO RELATED PATENT APPLICATIONS

This application claims priority to Chinese Patent Application No. 201711009667.8, filed on Oct. 25, 2017 and entitled "BIOS FLASHING METHOD AND BIOS IMAGE FILE PROCESSING METHOD", which is hereby incorporated by reference in its entirety.

TECHNICAL FIELD

The present invention relates to the field of computers, and particularly relates to BIOS (Basic Input/Output System) flashing methods and BIOS image file processing methods.

BACKGROUND

With the development of computer technology, many kinds of computing devices are becoming ever more widely used. Computing devices usually include a hardware system, a BIOS and an operating system.

A BIOS is a set of procedures burned into ROM (Read-Only Memory) chips, capable of providing lowest-level, most direct hardware configuration or control interfaces to the operating system. The operating system may, through the BIOS, control the hardware system, thereby realizing various functions of the electronic device. That is to say, a BIOS is an important bridge to communication between the hardware system and the operating system in a computing device, and security and reliability of the BIOS will directly impact security and reliability of the computing device. Therefore, BIOS flashing and the processing of BIOS image files also becomes ever more important.

In present technology, a computing device may obtain a BIOS image file from a BIOS management server. The BIOS management server may generate a BIOS image file or obtain an image file provided by a BIOS, and send the BIOS image file to the computing device. After receiving the BIOS image file, the computing device may perform BIOS flashing based on the BIOS image file, and thereafter the computing device may start up the BIOS and then load the upper-level operating system, causing the computing device to operate normally.

However, during the above-mentioned process of obtaining and flashing the BIOS image file, the BIOS image file may have been altered or damaged, such as by having a virus or Trojan horse embedded therein, thereby seriously threatening security and reliability of the computing device.

SUMMARY

This summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Given the above-mentioned problems, a BIOS flashing method and a BIOS image file processing method, provided by the present disclosure to overcome the above-mentioned problems or at least partially solve the above-mentioned problems, are set forth.

According to the present disclosure, a BIOS flashing method is provided, including:

Obtaining a BIOS image file, the BIOS image file carrying a first verification parameter and a first file parameter;

Verifying that the first verification parameter has validity;

Verifying that the BIOS image file has completeness based on the first file parameter; and Employing the BIOS image file verified as having completeness to perform BIOS flashing.

Optionally, the first file parameter is generated based on the BIOS image file.

Optionally, the BIOS image file further carries a private key signature of a BIOS management server, and the method further includes:

Based on a public key of the BIOS management server, verifying that the BIOS image file has validity.

Optionally, the BIOS image file further carries a security certificate of a BIOS management server, and the method further includes:

Verifying that the security certificate of the BIOS management server has validity.

Optionally, based on the first file parameter, verifying that the BIOS image file has completeness includes:

Based on the BIOS image file, generating a second file parameter; and

Verifying that the second file parameter and the first file parameter are consistent, wherein if consistent, the BIOS image file has completeness.

Optionally, the BIOS image file further carries a file parameter algorithm identifier, and based on the BIOS image file, generating a second file parameter includes:

Based on the file parameter algorithm identifier and the BIOS image file, generating the second file parameter.

Optionally, obtaining the BIOS image file includes:

Sending a BIOS image file obtaining request to a BIOS management server, the BIOS image file obtaining request carrying a second verification parameter and BIOS image file version information, the first verification parameter being generated based on the second verification parameter; and Verifying that the first verification parameter has validity includes:

Based on the second verification parameter, verifying that the first verification parameter has validity.

Optionally, after employing the BIOS image file to perform BIOS flashing, the method further includes:

Based on a private key of the data server, signing the first file parameter; and Storing the private key signature of the data server and the first file parameter.

Optionally, the method further includes:

Based on the first verification parameter, generating a third verification parameter; and Sending the third verification parameter and the first file parameter carrying the private key signature of the data server to the BIOS management server, to cause the BIOS management server to, based on the third verification parameter, verify that the first verification parameter has validity, and store the first file parameter carrying the private key signature of the data server.

Optionally, before employing the BIOS image file to perform BIOS flashing, the method further includes:

Detecting a flash write signal.

Optionally, before employing the BIOS image file to perform BIOS flashing, the method further includes:

Verifying that a BIOS flashing program has validity and completeness.

According to the present disclosure, a BIOS image file processing method is provided, including:

Receiving a BIOS image file obtaining request, the BIOS image file obtaining request carrying a second verification parameter;

Obtaining a BIOS image file and generating a first file parameter of the BIOS image file;

Based on the second verification parameter generating a first verification parameter; and Sending the first file parameter, the first verification parameter, and the BIOS image file together to the data server, causing the data server to verify that the first verification parameter has validity, and verify, based on the first file parameter, that the BIOS image file has completeness.

Optionally, the BIOS image file obtaining request further carries a security certificate of the data server, and before obtaining a BIOS image file and generating a first file parameter of the BIOS image file, the method further includes:

Verifying that the security certificate of the data server has validity.

Optionally, the BIOS image file obtaining request further carries BIOS image file version information, and obtaining the BIOS image file includes:

Based on the BIOS image file version information, obtaining the BIOS image file.

Optionally, the BIOS image file version information and the second verification parameter carry a public key signature of the BIOS management server, and the method further includes:

Based on a private key signature of the BIOS management server, verifying that the BIOS image file version information and the second verification parameter have validity.

Optionally, before obtaining the BIOS image file, the method further includes:

Obtaining BIOS-related information provided by a BIOS vendor server, the BIOS-related information including at least one of vendor server information and BIOS image file version information; and After obtaining the BIOS image file, the method further includes:

Based on the BIOS-related information, obtaining a required public key from multiple types of public keys of the BIOS vendor server, the BIOS image file carrying a signature generated by a private key corresponding to the source BIOS vendor server; and Performing signature verification upon the BIOS image file employing the obtained public key.

Optionally, the BIOS-related information further includes a first file parameter of the BIOS image file, and the method further includes:

Based on the first file parameter, verifying that the BIOS image file has completeness.

Optionally, obtaining a BIOS image file and generating a first file parameter of the BIOS image file includes:

Generating the BIOS image file, and, based on the generated BIOS image file, generating a corresponding first file parameter.

Optionally, before generating the BIOS image file, and, based on the generated BIOS image file, generating a corresponding first file parameter, the method further includes:

Verifying that a BIOS generating program has validity and completeness.

Optionally, after obtaining a BIOS image file and generating a first file parameter of the BIOS image file, the method further includes:

Based on the private key of the BIOS management server, signing the BIOS image file and the first file parameter, causing the data server to, based on a public key of the BIOS management server, verify that the BIOS image file and the first file parameter have validity.

According to the present disclosure, a data processing method is provided, including:

Obtaining a BIOS image file, the BIOS image file carrying a first verification parameter and a first file parameter;

Determining that the first verification parameter complies with a preset rule; and Based on the first file parameter, determining that the BIOS image file is not altered.

Optionally, after, based on the first file parameter, determining that the BIOS image file is not altered, the method further includes:

Employing the BIOS image file to perform BIOS flashing.

According to the present disclosure, a computing device is provided, including memory, a processor and computer programs stored on the memory and runnable on the processor, characterized by the processors, while executing the computer programs, implementing one or more of the aforementioned methods.

According to the present disclosure, a computer-readable storage medium is provided, having stored thereon computer programs, characterized by the computer programs, while being executed by a processor, implementing one or more of the aforementioned methods.

According to an example embodiment of the present disclosure, a BIOS image file may be obtained, the BIOS image file carrying a first verification parameter as well as a first file parameter generated based on the BIOS image file. Therefore, through verifying that the first verification parameter has validity, thereby a procedure of obtaining the BIOS image file is determined as secure and reliable, and through verifying that the BIOS image file has completeness based on the first file parameter, thereby the obtained BIOS image file is determined as complete. So, through performing flashing through the verified BIOS image file, the likelihood of flashing an altered or damaged BIOS image file may be reduced, and security and reliability of the data server are improved.

The above-mentioned is merely an overview of technical solutions of the present disclosure; in order to more clearly understand the techniques of the present disclosure, be able to implement such according to the contents of the specification, whether for the above-mentioned purposes of the present disclosure or for other purposes, and more evidently understand features and benefits thereof, particular example embodiments of the present disclosure are set forth below.

BRIEF DESCRIPTION OF THE DRAWINGS

By reading the below detailed description of embodiments, various other advantages and benefits thereof will become evident to persons of ordinary skill in the art. The objective of the drawings is merely to illustrate certain exemplary embodiments, and not to limit the present disclosure. Moreover, throughout the drawings, the same reference numerals indicate the same elements. Of the drawings.

DETAILED DESCRIPTION

Figure 1:
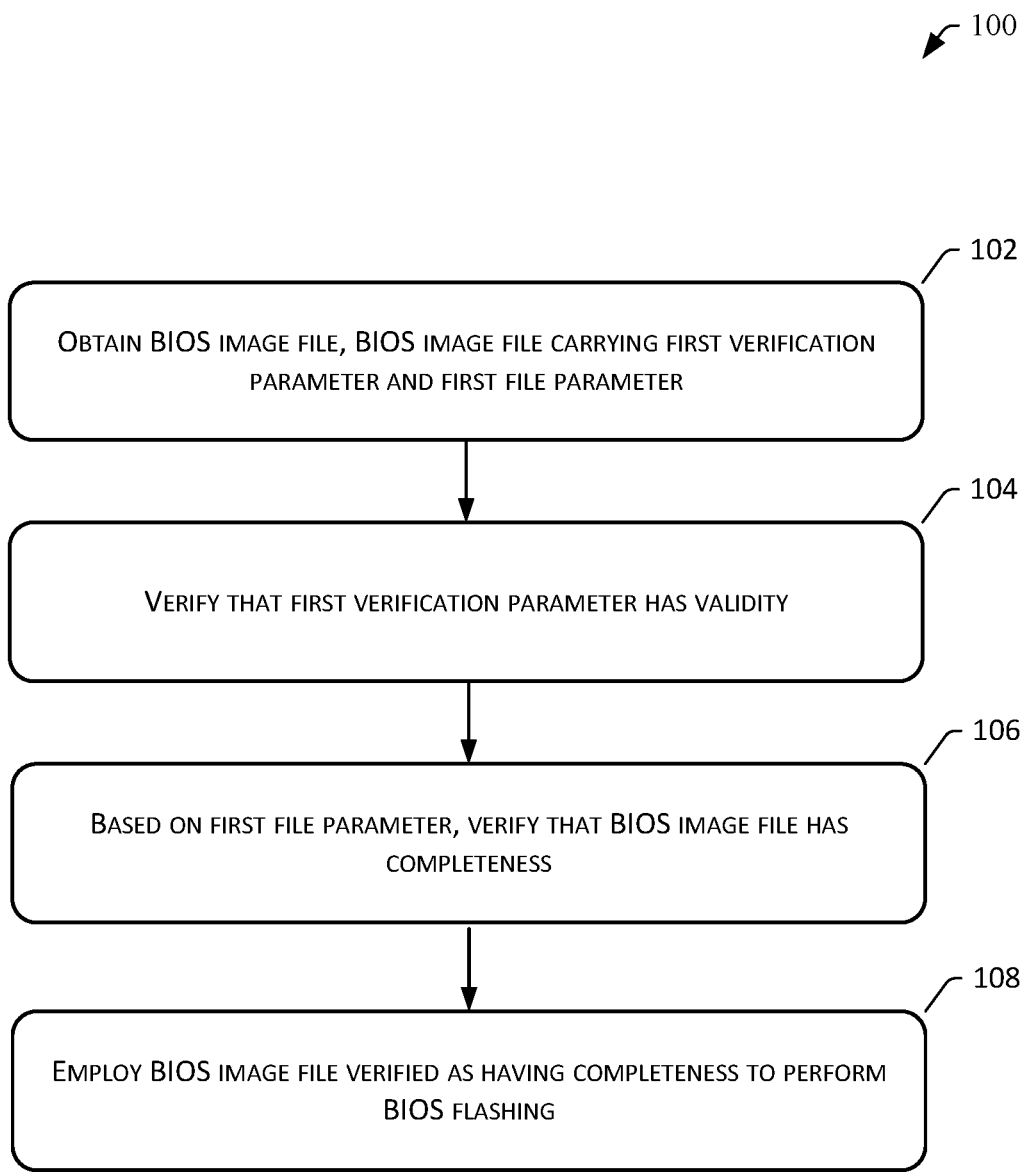
FIG. 1 illustrates a flowchart of a BIOS flashing method according to a first example embodiment of the present disclosure.

Below, in reference to the drawings, exemplary embodiments of the present disclosure are described in further detail. Although the drawings illustrate exemplary embodiments of the present disclosure, it should be understood that the present disclosure may be implemented in various fashions, which shall not be limited by the example embodiments set forth herein. To the contrary, these exemplary embodiments are provided for a more thorough understanding of the present disclosure, and moreover to completely convey the scope of the present disclosure to persons skilled in the art.

To facilitate an in-depth understanding of example embodiments of the present disclosure by persons skilled in the art, definitions of industry terminology included in example embodiments of the present disclosure shall first be introduced below.

A BIOS image file is flashed onto ROM chips of a computing device. Thereby, when the computing device starts up the BIOS image file, lowest-level, most direct hardware configuration or control interfaces are provided to an operating system, facilitating controlling the running of a hardware system through the operating system.

A first verification parameter is utilized to indicate whether the procedure of obtaining a BIOS image file is secure and reliable, that is, indicate whether a BIOS image file is secure and reliable.

A first file parameter is utilized to indicate the entire content of a BIOS image file, for example, to indicate whether a BIOS image file is complete.

A computing device may include devices capable of obtaining and flashing BIOS image files as well as capable of other processing based on the BIOS image file (such as starting up the BIOS image file), such as a mobile phone, a personal computer, a tablet computer, a wearable device, a smart television, a data server and the like. The computing device may engage in interactions with a BIOS management server, obtaining client terminal, plugin, and BIOS flashing services, and BIOS image file processing services, and including the apparatuses of the below FIGS. 9 and 11-12, implementing the method steps regarding data servers of the method flowcharts of the below FIGS. 1, 3-5, and 7-8. Thereby, BIOS image file flashing is performed, and other processing based on the BIOS image file is also performed. According to the below example embodiments, wherein the computing device is a data server by way of example, BIOS flashing methods and BIOS image file processing methods provided by the present disclosure are described. Herein, a computing device may include a TPM (Trusted Platform Module), a BIOS image file being verified through the TPM.

A BIOS management server may include a server or a server cluster, and thereby provides the above-mentioned client terminal and plugin services or various serviced based on a BIOS image file to the computing device. The BIOS management server may be an apparatus of the below FIG. 10 or 12, implementing the method steps regarding a BIOS management server of the method flowcharts of the below FIG. 2, 3, 5, 6, or 8.

A client terminal may include at least one application. The client terminal may run on the computing device, and thereby implement BIOS flashing methods or BIOS image file processing methods provided by the present disclosure.

A plugin may be included in the above-mentioned application running on a computing device, and thereby implement BIOS flashing methods or BIOS image file processing methods provided by the present disclosure.

Example embodiments of the present disclosure may be applied to a setting of flashing a BIOS of a computing device. During a procedure of obtaining or flashing a BIOS image file, the BIOS image file has a possibility of being altered or damaged, threatening security and reliability of the computing device. Therefore, to reduce the problem of security or reliability of a computing device lowering as a result of the above-mentioned reasons, while flashing a BIOS image file, the obtained BIOS image file may be verified, including verifying whether a first verification parameter carried by the BIOS image file has validity, to determine that the procedure of obtaining the BIOS image file is secure and reliable. As well, based on a first file parameter carried by the BIOS image file, whether the BIOS image file has completeness is verified, to determine that the obtained BIOS image file is complete. If verification passes, the obtained BIOS image file may be determined to be secure and reliable, and therefore flashing the BIOS image file or other processing upon the BIOS image file are also secure and reliable; that is to say, security and reliability of the computing device have been ensured.

First Example Embodiment

Referring to FIG. 1, a flowchart of a BIOS flashing method 100 according to an example embodiment of the present disclosure is illustrated, particular steps thereof including:

Step 102, obtaining a BIOS image file, the BIOS image file carrying a first verification parameter and a first file parameter.

In order to flash a BIOS image file onto a data server, the data server may obtain the BIOS image file to be flashed. In order to subsequently perform verification upon the obtained BIOS image file, to reduce the likelihood of flashing and starting up an altered or damaged BIOS image file, and improve security and reliability of the data server, the BIOS image file may carry a first verification parameter and a first file parameter.

The data server may send a BIOS image file obtaining request to a BIOS management server, and obtain a BIOS image file from the BIOS management server.

The BIOS image file obtaining request is configured to cause the BIOS management server to send a BIOS image file to the data server.

The first verification parameter may be agreed upon in advance by the data server and the BIOS management server, or may be generated by a generation method agreed upon in advance by the data server and the BIOS management server. Thereby, the data server may, based on the validity of the first verification parameter, determine that the obtained BIOS image file is secure and reliable.

The first file parameter may be generated based on the entire content of the BIOS image file; for example, it may include a hash value generated from the BIOS image file, or, it may be a digest of the composition of at least part of the data of the BIOS image file.

Step 104, verifying that the first verification parameter has validity.

When the first verification parameter is agreed upon in advance by the data server and the BIOS management server, the data server may compare the first verification parameter and a pre-stored verification parameter, determining the first verification parameter as valid if they are consistent, and determining the first verification parameter as invalid if they are inconsistent.

When the first verification parameter is generated by a generation method agreed upon in advance by the data server and the BIOS management server, the data server may generate a verification parameter according to the method agreed upon in advance, and compare the first verification parameter to the generated verification parameter, determining the first verification parameter as valid if they are consistent, and determining the first verification parameter as invalid if they are inconsistent.

Herein, if the first verification parameter is verified as having validity, BIOS flashing may be performed by continuing to execute the subsequent steps; if verification fails, that is, the first verification parameter lacks validity, the BIOS flashing process may be stopped, and the verification result may be divulged through speech, text, images, and such fashions. Of course, to ensure that the BIOS image file will not damage the data server, the BIOS image file may further be quarantined or deleted.

Step 106, based on the first file parameter, verifying that the BIOS image file has completeness.

The data server may, based on the obtained BIOS image file, generate a file parameter, and compare the generated file parameter with the first file parameter, determining the BIOS image file as complete if they are consistent, and determining the BIOS image file as incomplete if they are inconsistent.

For example, when the first file parameter is a hash value of the BIOS image file, the data server may, based on the obtained BIOS image file, generate a hash value of the BIOS image file, and compare the generated hash value with a hash value carried by the BIOS image file, determining the obtained BIOS hash image file as complete if they are consistent, and determining the obtained BIOS hash image file as incomplete if they are inconsistent.

Herein, if the BIOS image file is verified as having completeness, BIOS flashing may be performed by continuing to execute the subsequent steps; if verification fails, that is, the BIOS image file does not have completeness, the BIOS flashing process may be stopped, and the verification result may be divulged through speech, text, images, and such fashions. Of course, to ensure that the BIOS image file will not damage the data server, the BIOS image file may further be quarantined or deleted.

Step 108, employing the BIOS image file verified as having completeness to perform BIOS flashing.

Since the process of obtaining the BIOS image file has already been verified as secure and reliable, the obtained BIOS image file is also secure and reliable, so the BIOS image file may be employed to perform BIOS flashing.

The data server may, through a BIOS flashing program, flash the BIOS image file onto ROM of the data server, in order to subsequently start up the BIOS image file from the ROM, ensuring normal operation of the data server.

According to the present example embodiment of the present disclosure, a BIOS image file may be obtained, the BIOS image file carrying a first verification parameter as well as a first file parameter. Thereby, through verifying that the first verification parameter has validity, the procedure of obtaining the BIOS may be determined as secure and reliable, and through verifying that the BIOS image file has completeness based on the first file parameter, the obtained BIOS image file may be determined as complete. Thus, by employing a BIOS image file that has passed verification to perform flashing, the likelihood of flashing an altered or damaged BIOS image file may be reduced, improving security and reliability of the data server.

Second Example Embodiment

Figure 2:
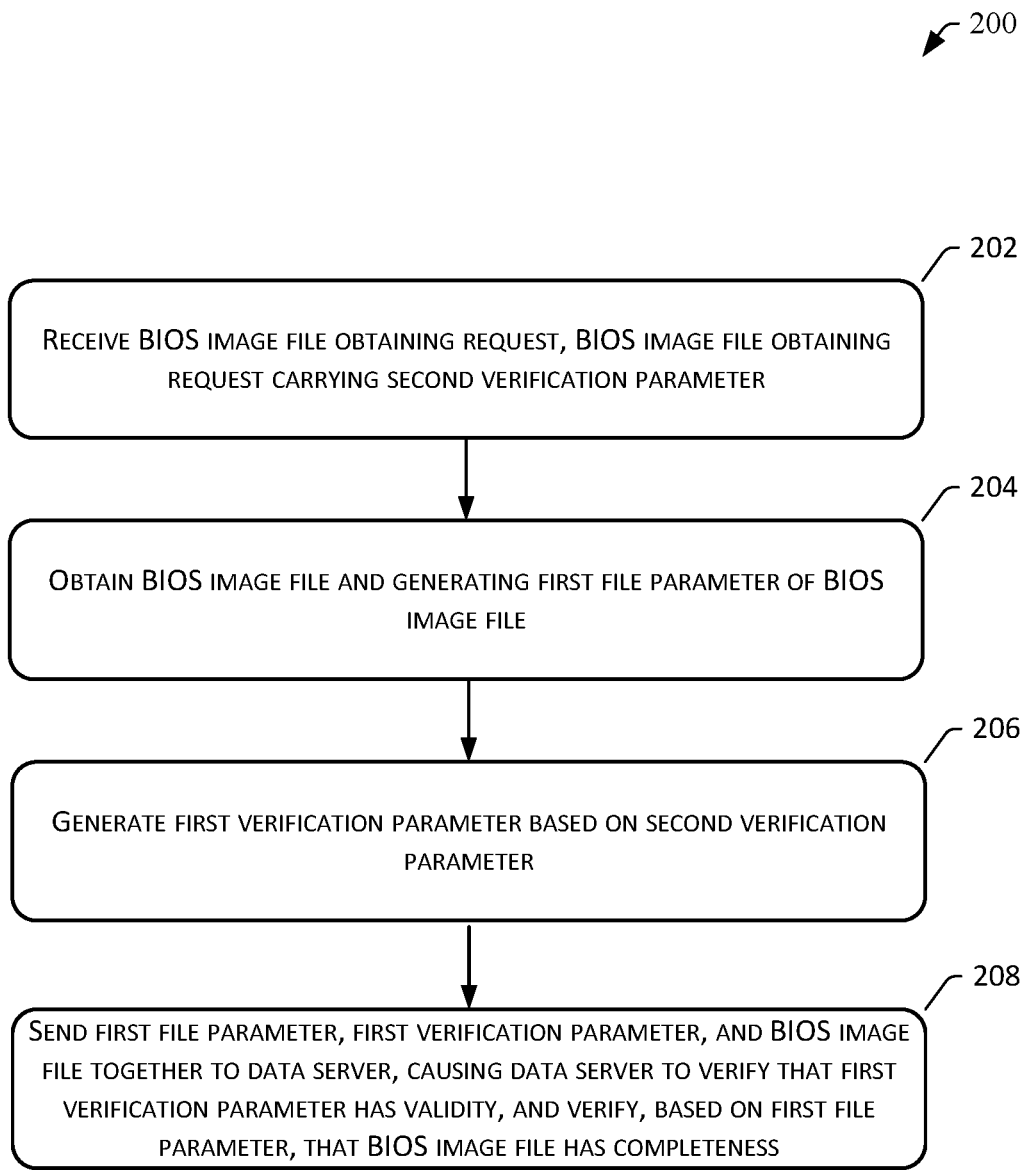
FIG. 2 illustrates a flowchart of a BIOS image file processing method according to a second example embodiment of the present disclosure.

Referring to FIG. 2, a flowchart of a BIOS image file processing method 200 according to an example embodiment of the present disclosure is illustrated, particular steps thereof including:

Step 202, receiving a BIOS image file obtaining request, the BIOS image file obtaining request carrying a second verification parameter.

In order to ensure the data server may obtain the BIOS image file, the BIOS management server may receive a BIOS image file obtaining request from the data server, and in order for the BIOS management server to subsequently generate a first verification parameter based on the second verification parameter, and to facilitate the data server to verify the process of obtaining the BIOS image file as secure and reliable, the image file may carry the second verification parameter.

Herein, the second verification parameter may be generated by the data server, and may be utilized for the BIOS management server to subsequently generate a first verification parameter.

For example, the second verification parameter may be a first random number generated by the data server by a random number generator algorithm agreed upon in advance with the BIOS management server.

Step 204, obtaining a BIOS image file and generating a first file parameter of the BIOS image file.

In order to facilitate the data server subsequently verifying whether the obtained BIOS image file is secure and reliable, the BIOS management server may obtain a BIOS image file, and generate a first file parameter of the BIOS image file.

The BIOS management server may obtain a BIOS image file from local storage, generate a BIOS image file, or obtain a BIOS file from another source (such as a BIOS vendor server of a BIOS vendor).

Herein, a BIOS vendor server may include servers of different BIOS vendors, and the BIOS vendor server may provide BIOS image files to the BIOS management server.

A manner of generating a first file parameter of a BIOS image file may refer to aforementioned related descriptions, which shall not be reiterated herein.

Step 206, based on the second verification parameter generating a first verification parameter.

A manner by which the BIOS management server generates a first verification parameter may be the same as a method by which the data server generates a second verification parameter, which shall not be reiterated herein.

For example, the BIOS management server may, based on the aforementioned random number generator algorithm, generate a second random number based on the first random number.

Additionally, in practical applications, the BIOS management server may first execute the steps of generating a first verification parameter based on the second verification parameter, and then execute the steps of obtaining a BIOS image file and generating a first file parameter of the BIOS image file.

Step 208, sending the first file parameter, the first verification parameter, as well as the BIOS image file together to the data server, causing the data server to verify that the first verification parameter has validity, as well as verify, based on the first file parameter, that the BIOS image file has completeness.

Since the BIOS management server sends the first file parameter, the first verification parameter and the BIOS image file to the data server, therefore the data server is facilitated in determining that the procedure of obtaining the BIOS image file is secure and reliable, and also that the obtained BIOS image file is secure and reliable, reducing the likelihood of the data server obtaining an altered or damaged BIOS image file, thereby also reducing the likelihood of the data server flashing and starting up an altered or damaged BIOS image file, and thereby improving security and reliability of the data server.

The BIOS management server may carry the first file parameter and the first verification parameter in the BIOS image file, and send the BIOS image file to the data server.

According to the present example embodiment of the present disclosure, a BIOS image file obtaining request may be received; based on a second verification parameter of the BIOS image file obtaining request a first verification parameter is generated, and based on the obtained BIOS image file a first file parameter of the BIOS image file is generated. This ensures that a data server obtaining the BIOS image file may, through verifying that the first verification parameter has validity, determine the procedure of obtaining the BIOS image file as secure and reliable, and also, through verifying that the BIOS image file has completeness based on the first file parameter, determine the obtained BIOS image file as complete. This reduces the likelihood that the data server obtains altered or damaged BIOS image files, thereby also reducing the likelihood of the data server flashing and starting up an altered or damaged BIOS image file, and thereby improving security and reliability of the data server.

Third Example Embodiment

Figure 3:
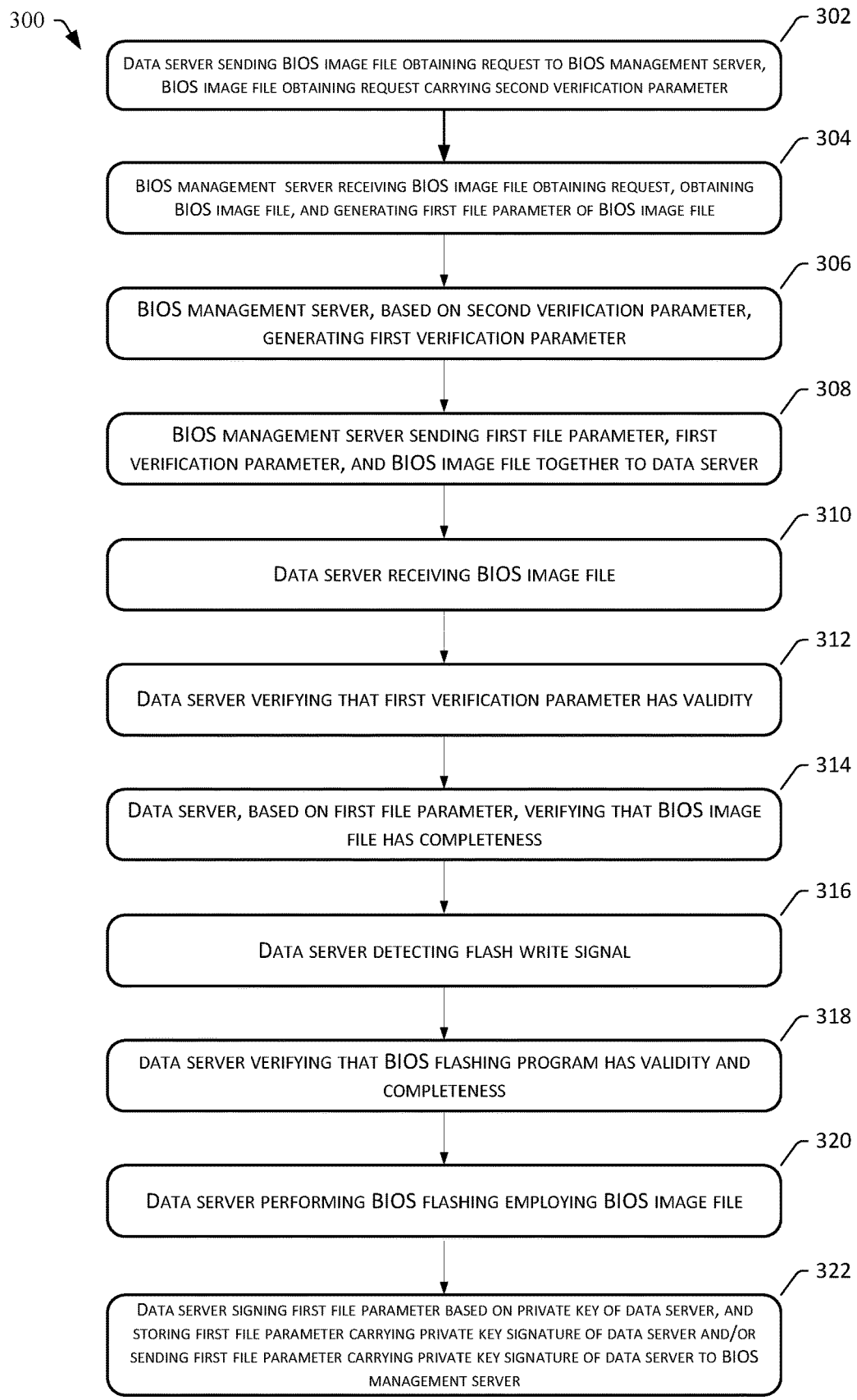
FIG. 3 illustrates a flowchart of a BIOS flashing and BIOS image file processing method according to a third example embodiment of the present disclosure.

Referring to FIG. 3, a flowchart of a BIOS flashing and BIOS image file processing method 300 according to an example embodiment of the present disclosure is illustrated, applied to interactions between a data server and a BIOS management server, particular steps thereof including:

Step 302, a data server sending a BIOS image file obtaining request to a BIOS management server, the BIOS image file obtaining request carrying a second verification parameter.

Herein, a manner by which the data server sends a BIOS image file obtaining request to the BIOS management server may refer to aforementioned related descriptions, which shall not be reiterated herein.

According to the example embodiment of the present disclosure, optionally, due to technological advances and such reasons, a BIOS image file may also have multiple versions, so that in order to improve reliability of the obtained BIOS image file, such as avoiding the problem of obtaining a low-versioned BIOS image file precipitating a rollback of a flashed BIOS image file, the BIOS image file obtaining request further carries BIOS image file version information.

Image file version information is utilized to indicate the version of a BIOS image file; for example, the image file version information may include a sequence composed of multiple numbers.

The data server may obtain version update information sent by the BIOS management server, thereby obtaining version information of a new version of a BIOS image file; of course, in practical applications, the data server may also obtain the version information of the BIOS image file required to be flashed in other fashions.

According to an example embodiment of the present disclosure, optionally, in order to ensure that the procedure of obtaining a BIOS image file is secure and reliable, avoiding obtaining BIOS image files from non-secure sources, the BIOS image file version information and the second verification parameter carry a public key signature of the BIOS management server.

Herein, a public key signature of the BIOS management server may be acquired through signing data by a private key of the BIOS management server, where signing the data is understood as encrypting the data. Data encrypted through signing by the public key of the BIOS management server may be decrypted by the private key of the BIOS management server. Of course, the data may also be encrypted by the private key of the BIOS management server, and encrypted data may be decrypted by the public key of the BIOS management server.

The data server may, in advance, from a trustworthy third-party device (such as a PCA (Platform Certification Authority) of a server cluster where the data server and the BIOS management server are present) obtain a corresponding public key and secret key, as well as a public key of the BIOS management server; correspondingly, the BIOS management server may obtain a corresponding public key and secret key, as well as a public key of the data server, by the same fashion.

Herein, the third-party device may have a public key and secret key of the third-party device stored therein.

According to an example embodiment of the present disclosure, optionally, in order to further ensure that the procedure of obtaining a BIOS image file is secure and reliable, reduce the likelihood of obtaining BIOS image files from non-secure sources, and improve security and reliability of obtaining the BIOS image file, the BIOS image file obtaining request may further carry a security certificate of the data server.

Herein, a security certificate is utilized to indicate that a device having the security certificate is secure and trustworthy. A data server or BIOS management server may obtain corresponding security certificates from the aforementioned third-party device. Of course, a third-party device may have a security certificate of the third-party device stored therein.

Of course, in practical applications, a BIOS image file obtaining request may further include other information, such as a device identifier of the data server.

Herein, a device identifier is utilized to uniquely indicate a device, where the device identifier may include a factory serial number or name of the device and the like.

For example, data server C sends an image file obtaining request 1 to a BIOS management server, and image file obtaining request 1 includes: C, Cert_AIKc, {BIOS_Version, n}AIKpk_s. Herein, C is a device identifier, Cert_AIKc is a security certificate, BIOS_Version is image file version information, n is a random number serving as a second verification parameter, AIKpk_s is a public key of the BIOS management server, and {BIOS_Version, n}AIKpk_s is the image file version information and the second verification parameter after being signed by the public key of the BIOS management server.

Step 304, the BIOS management server receiving the BIOS image file obtaining request, obtaining a BIOS image file, and generating a first file parameter of the BIOS image file.

Herein, a manner by which the BIOS management server obtains a BIOS image file and generates a first file parameter may refer to aforementioned related descriptions, which shall not be reiterated herein.

According to an example embodiment of the present disclosure, optionally, in order to ensure security and reliability of the procedure of obtaining BIOS image files, and reduce the likelihood of providing BIOS image files to untrustworthy devices, the BIOS management server verifies that the security certificate of the data server has validity.

Herein, if the security certificate of the data server is verified as having validity, the BIOS management server may continue to execute the subsequent steps to provide the BIOS image file to the data server. If the verification fails, that is, the security certificate of the data server lacks validity, the BIOS management server may cease to execute the subsequent steps, thereby not providing the BIOS image file to the data server. Of course, the BIOS management server may further send a BIOS image file obtaining failure message to the data server, and through the BIOS image file obtaining failure message indicate a reason why the BIOS image file cannot be provided to the data server.

According to an example embodiment of the present disclosure, optionally, in order to ensure security and reliability of the procedure of obtaining BIOS image files, and reduce the likelihood of providing BIOS image files to untrustworthy devices, the BIOS management server, based on a private key signature of the BIOS management server, verifies that the BIOS image file version information and the second verification parameter have validity.

Herein, the BIOS management server may, based on a private key of the BIOS management server, decrypt BIOS image file version information and second verification parameter carrying a public key signature of the BIOS management server. If successful, the BIOS image file version information and the second verification parameter are determined as valid; if not, the BIOS image file version information and the second verification parameter are determined as invalid.

If the BIOS image file version information and the second verification parameter are verified as having validity, the BIOS management server may continue to execute the subsequent steps to provide the BIOS image file to the data server; if verification of either of the BIOS image file version information and the second verification parameter fails, that is, either of the BIOS image file version information and the second verification parameter lacks validity, the BIOS management server may cease to execute the subsequent steps, thereby not providing the BIOS image file to the data server. Of course, the BIOS management server may further send a BIOS image file obtaining failure message to the data server, and through the BIOS image file obtaining failure message indicate a reason why the BIOS image file cannot be provided to the data server.

According to an example embodiment of the present disclosure, optionally, in order to ensure accurately providing the BIOS image file requested by the data server to the data server, reliability of the BIOS image file, as well as reliability of the data server, the BIOS management server obtains the BIOS image file based on the BIOS image file version information.

Herein, the BIOS management server may, based on the BIOS image file version information, query a BIOS configuration file database as to whether a corresponding BIOS image file exists; if so, the BIOS image file is obtained, and if not, a corresponding BIOS image file is generated.

A BIOS configuration file database may be acquired by being stored in advance on the BIOS management server. The BIOS configuration file database may include a device identifier of the data server, a BIOS image file corresponding to the data server, image file version information of the BIOS image file, a first file parameter of the image file carrying a public key signature of the data server, and the like.

According to an example embodiment of the present disclosure, optionally, the BIOS management server may obtain a BIOS image file from a BIOS vendor, that is, obtain a BIOS image file from a BIOS vendor server. Thereby, in order to ensure security and reliability of the obtained BIOS image file, the BIOS management server may obtain BIOS-related information provided by the BIOS vendor server, the BIOS-related information including at least one of vendor server information and BIOS image file version information. Correspondingly, after obtaining the BIOS image file, the BIOS management server may, based on the BIOS-related information, obtain a required public key from multiple types of public keys of the BIOS vendor server, the BIOS image file carrying a signature generated by a private key corresponding to the source BIOS vendor server, and perform signature verification upon the BIOS image file employing the obtained public key.

Herein, performing signature verification upon the BIOS image file employing the obtained public key may be understood as verifying that the BIOS image file has validity. If the BIOS image file has validity, subsequent steps may continue execution to cause the BIOS image file to be provided to the data server. If verification fails, that is, the BIOS image file does not have validity, obtaining the BIOS image file may be determined as having failed, and a BIOS image file obtaining failure message is sent to the data server. Of course, the BIOS management server may further send a BIOS image file obtaining failure message to the BIOS vendor server, causing the BIOS vendor server to determine that the BIOS image file could not be successfully provided to the BIOS management server; or, the BIOS management server may perform quarantining or deletion upon the BIOS image file.

According to an example embodiment of the present disclosure, optionally, the BIOS management server may obtain a BIOS image file from a BIOS vendor, that is, obtain a BIOS image file from a BIOS vendor server. Thereby, in order to reduce the likelihood of obtaining an altered or damaged BIOS image file, and thereby ensure security and reliability of the obtained BIOS image file, the BIOS-related information further includes a first file parameter of the BIOS image file. Correspondingly, the BIOS management server may, based on the first file parameter, verify that the BIOS image file has completeness.

Herein, a manner of verifying that the BIOS image file has completeness based on the first file parameter may refer to aforementioned related descriptions, which shall not be reiterated herein.

Additionally, a manner of processing the BIOS image file obtained from the BIOS vendor server after success or failure of completeness verification may be the same as a manner of processing the BIOS image file obtained from the BIOS vendor server after success or failure of validity verification, which shall not be reiterated herein.

According to an example embodiment of the present disclosure, optionally, in order to accurately perform completeness verification upon the BIOS image file based on the first file parameter, that is, in order to improve reliability of performing completeness verification upon the BIOS image file, the BIOS-related information further includes a file parameter algorithm identifier. Correspondingly, the BIOS management server may, based on the file parameter algorithm identifier, compute a file parameter of the obtained BIOS image file, thereby comparing the computed file parameter with the first file parameter, verifying the completeness of the BIOS image file.

Herein, a file parameter algorithm identifier is utilized to indicate a file parameter computation method based on a BIOS image file. For example, when the file parameter is a hash value, a file parameter computation identifier may include a hash value algorithm type, including sha-1, sha-256, sha-3 and the like.

According to an example embodiment of the present disclosure, in order to ensure being able to reliably obtain a BIOS image file provided to the data server, and ensure reliability of obtaining the BIOS image file, the BIOS management server may generate the BIOS image file, and generate a corresponding first file parameter based on the generated BIOS image file. The BIOS management server may, through a BIOS generation program compilation, generate a BIOS image file.

Herein, the BIOS generation program is utilized to generate a BIOS image file, where the BIOS generation program may be obtained in advance by the BIOS management server.

A manner of generating a first file parameter based on a BIOS image file may refer to aforementioned related descriptions, which shall not be reiterated herein.

According to an example embodiment of the present disclosure, optionally, since the BIOS management server may generate a BIOS image file, therefore in order to ensure security and reliability of generating the BIOS image file, prior to generating the BIOS image file, the BIOS management server may verify that the BIOS generation program has validity and completeness.

Herein, a manner of verifying that an obtained BIOS generation program has validity and completeness, as well as a manner of processing after success or failure of verification thereof, may be the same as, respectively, a manner of verifying that an obtained BIOS image file has validity and completeness, as well as a manner of processing after success or failure of verification thereof, which shall not be reiterated herein.

According to an example embodiment of the present disclosure, optionally, since BIOS image files may come from multiple BIOS vendors, therefore to avoid the problem of the BIOS management server encountering difficulty in performing signature verification upon BIOS image files provided by other BIOS vendors, improving security of subsequent operation and maintenance and reducing cost, the BIOS management server may, based on a private key of the BIOS management server, sign the BIOS image file and the first file parameter.

Herein, the BIOS management server may, through a TPM of the BIOS management server, sign the BIOS image file and the first file parameter.

The BIOS management server obtains, in advance, multiple security certificates as well as multiple sets of public keys and private keys, and thereby may, based on at least one of a BIOS vendor, version of a BIOS image file, the current time, a security level, and the like, select a corresponding private key to sign the BIOS image file.

A security level may include a security level of the data server, a security level of the BIOS image, or a security level of the BIOS vendor.

Additionally, in practical applications, in order to facilitate subsequent operation and maintenance of the flashed BIOS image file, improving security and reliability of the data server, the BIOS management server may add the public key of the BIOS management server to the BIOS image file.

Step 306, the BIOS management server, based on the second verification parameter, generating a first verification parameter.

Herein, a manner of the BIOS management server generating a first verification parameter based on the second verification parameter may refer to aforementioned related descriptions, which shall not be reiterated herein.

Step 308, the BIOS management server sending the first file parameter, the first verification parameter, as well as the BIOS image file together to the data server.

Herein, a manner of the BIOS management server sending the first file parameter, the first verification parameter, as well as the BIOS image file to the data server may refer to aforementioned related descriptions, which shall not be reiterated herein.

According to an example embodiment of the present disclosure, optionally, in order to ensure the data server performs verification upon the validity of the obtained BIOS image file, ensure the source of the BIOS image file is secure and reliable, and improve security and reliability of obtaining the BIOS image file as well as of the data server, the BIOS management server may, through a private key of the BIOS management server, sign the BIOS image file, and correspondingly the BIOS image file carries the private key signature of the BIOS management server.

Herein, the BIOS management server signing the BIOS image file through the private key of the BIOS management server may be understood as encrypting the BIOS image file.

Additionally, the BIOS management server may further, through the private key of the BIOS management server, sign the first file parameter.

According to an example embodiment of the present disclosure, optionally, in order to facilitate the data server verifying the obtained BIOS image file, ensure that the source of the BIOS image file is reliable, and improve security and reliability of the BIOS image file as well as the data server, the BIOS management server may further send a security certificate of the BIOS management server to the data server, and correspondingly the BIOS image file further carries the security certificate of the BIOS management server.

Of course, in practical applications, the security certificate of the BIOS management server may not be carried in the BIOS image file, but rather, the security certificate of the BIOS management server may be directly sent to the data server.

According to an example embodiment of the present disclosure, optionally, in order to ensure the data server, after obtaining the BIOS image file, may accurately compute a file parameter, and compare the computed file parameter with the first file parameter, and thereby improve reliability of verifying the completeness of the BIOS, the BIOS management server may send a file parameter algorithm identifier to the data server, and correspondingly, the BIOS image file carries the file parameter algorithm identifier.

Herein, the BIOS management server may, through the public key of the data server, sign the file parameter algorithm identifier, and send the file parameter algorithm identifier carrying the public key signature of the data server to the data server.

Additionally, the BIOS management server may, through the public key of the data server, sign the first verification parameter, and send the first verification parameter carrying the public key signature of the data server to the data server.

For example, the BIOS management server sends to the data server: S, Cert_AIKs, hash(BIOS.ISO), {BIOS.ISO}AIKpriv_s, {n-2, hash_type}AIKpk_c. Herein, S is a device identifier of the BIOS management server, Cert_AIKs is a security certificate of the BIOS management server, hash(BIOS.ISO) is a hash value of a BIOS image file, AIKpriv_s is a private key of the BIOS management server, {BIOS.ISO}AIKpriv_s is the BIOS image file carrying a private key signature of the BIOS management server, AIKpk_c is a public key of the data server, n-2 is a random number serving as a first verification parameter, computed from the aforementioned random number n serving as the second verification parameter, hash_type is a file parameter algorithm identifier, and {n-2, hash_type}AIKpk_c is the first verification parameter and the file parameter algorithm identifier carrying the public key signature of the data server.

Step 310, the data server receiving the BIOS image file.

In order to flash the BIOS image file onto the data server, and ensure normal operation of the data server, the data server may receive the BIOS image file.

Step 312, the data server verifying that the first verification parameter has validity.

Herein, a manner of the data server verifying the first verification parameter may refer to aforementioned related descriptions, which shall not be reiterated herein.

According to an example embodiment of the present disclosure, optionally, in order to improve reliability of verifying validity of the first verification parameter and ensure security and reliability of the procedure of obtaining a BIOS image file, thereby reducing likelihood of flashing an altered or damaged BIOS image file and improving security and reliability of the data server, the data server may, based on the second verification parameter, verify that the first verification parameter has validity.

The data server may, based on the second verification parameter, re-compute a verification parameter, and compare the computed verification parameter with the first verification parameter, determining the first verification parameter as valid if they are consistent, and determining the first verification parameter as invalid if they are inconsistent.

Herein, the data server may, according to a verification parameter generation algorithm agreed upon in advance with the BIOS management server (such as a random number generator algorithm), re-generate a verification parameter based on the second verification parameter. Of course, the data server may further store, in advance, a correspondence relationship between the second verification parameter and the first verification parameter, and, through the second verification parameter, obtain a new verification parameter from the correspondence relationship between the second verification parameter and the first verification parameter.

Of course, if the first verification parameter carries a public key signature of the data server, prior to verifying the first verification parameter as having validity, the data server may, through the private key of the data server, perform validity verification upon the first verification parameter carrying the public key signature of the data server. That is, the first verification parameter carrying the public key signature of the data server is decrypted by the private key of the data server; if decryption succeeds, by the aforementioned steps the first verification parameter continues to undergo further validity verification, and if not—that is, the first verification parameter is determined as invalid—the continued further validity verification of the first verification parameter by the aforementioned steps is stopped.

According to an example embodiment of the present disclosure, optionally, in order to facilitate the data server verifying the obtained BIOS image file, ensure that the source of the BIOS image file is secure and reliable, and improve security and reliability of obtaining BIOS image files as well as the data server, the data server may verify that the security certificate of the BIOS management server has validity.

Herein, a manner of processing after success or failure of verifying the validity of the security certificate of the BIOS management server may be the same as the aforementioned manner of processing after success or failure of verifying the validity of the first verification parameter, which shall not be reiterated herein.

According to an example embodiment of the present disclosure, optionally, in order to facilitate the data server verifying the obtained BIOS image file, ensure that the source of the BIOS image file is secure and reliable, and improve security and reliability of the obtained BIOS image file as well as the data server, the data server may, based on the public key of the BIOS management server, verify that the BIOS image file has validity.

Herein, the data server may, based on the public key of the BIOS image server, verify the validity of the BIOS image file, that is, based on the private key of the BIOS management server, decrypt the BIOS image file carrying the public key of the BIOS management server. If decryption succeeds, the BIOS image file is determined as valid, and if decryption does not succeed, the BIOS image file is determined as invalid.

A manner of processing after success or failure of verifying the validity of the BIOS image file may be the same as the aforementioned manner of processing after success or failure of verifying the completeness of the BIOS image file, which shall not be reiterated herein.

Step 314, the data server, based on the first file parameter, verifying that the BIOS image file has completeness.

Herein, a manner of the data server verifying the completeness of the BIOS image based on the first file parameter may refer to aforementioned related descriptions, which shall not be reiterated herein.

According to an example embodiment of the present disclosure, optionally, since the file parameter may indicate the entire content of the BIOS image file, and the first file parameter may be generated by the BIOS management server, therefore, in order to accurately verify whether the obtained BIOS image file is entirely consistent with the BIOS image file sent by the BIOS management server, improving accuracy of verifying the completeness of the BIOS image file, the data server may, based on the BIOS image file, generate a second file parameter, and verify whether the second file parameter is consistent with the first file parameter. If consistent, the BIOS image file has completeness.

Herein, a manner of generating a second file parameter based on the BIOS image file is the same as a manner of generating a first file parameter based on the BIOS image file, which shall not be reiterated herein.

According to an example embodiment of the present disclosure, optionally, since a problem wherein the completeness of the BIOS image file is verified incorrectly may result when the first file parameter and the second file parameter are generated in different manners, in order to further improve the accuracy of verifying the completeness of the BIOS image file, the data server may generate the second file parameter based on the file parameter algorithm identifier and the BIOS image file.

Step 316, the data server detecting a flash write signal.

In order to accurately flash the BIOS image file onto the data server, reducing the likelihood of errors in flashing, the data server may, upon detecting a flash write signal, execute the below-mentioned steps and flash the BIOS image file onto the data server.

A flash write signal is utilized to instruct the data server to flash a BIOS image file.

According to an example embodiment of the present disclosure, optionally, since a hardware platform of the data server usually protects a memory region of a part of a chip to be flashed, the protection being selectable between permitted or prohibited thorough jumpers of a hardware motherboard, therefore, in order to avoid the above-mentioned BIOS image file verification procedure being skipped, that is, in order to not bypass a measurement procedure, and further reduce the likelihood of flashing an altered or damaged BIOS image file, the data server may further first detect a flash write signal, and then start to execute the steps of sending a BIOS image file obtaining request to the BIOS management server and obtaining a BIOS image file.

Herein, the data server may, through the flash write signal, connect with a privileged interrupt line, and, through the privileged interrupt line, control the generation of flash write signals, causing a CPU (Central Processing Unit) to execute specific interrupt processing flow, thereby ensuring that the above-mentioned BIOS image file verification process is not skipped.

Step 318, the data server verifying that the BIOS flashing program has validity and completeness.

Since the data server usually needs to perform BIOS image file flashing through a BIOS flashing program, if the flashing program is altered or damaged (such as having a Trojan horse embedded therein), this may cause flashing to fail or damage the completeness of the BIOS image file. Therefore, in order to improve security and reliability of flashing the BIOS image file, and improve security and reliability of the data server, the data server may verify the validity and completeness of the BIOS flashing program.

The BIOS flashing program is utilized to flash a BIOS image file onto ROM of the data server.

The data server may, in advance, obtain the BIOS flashing program from the BIOS management server or another device.

Herein, a manner of the data server obtaining the BIOS flashing program may be the same as a manner of the data server obtaining a BIOS image file. For example, the data server may send a BIOS flashing program obtaining request to the BIOS management server, where the BIOS flashing program obtaining request may carry a device identifier of the data server, a security certificate of the data server, flashing program version information as well as a second verification parameter, and the flashing program version information and the second verification parameter may carry a public key signature of the BIOS management server; the BIOS management server receives the BIOS flashing program, verifies the security certificate of the data server, and verifies the validity of the flashing program version information as well as the first verification parameter based on the private key of the BIOS management server. After verification passes, the BIOS management server obtains a BIOS flashing program, generates a first verification parameter based on the second verification parameter, generates a first file parameter corresponding to the BIOS flashing program based on the BIOS flashing program, and sends a device identifier of the BIOS management server, a security certificate of the BIOS management server, the BIOS flashing program, the first file parameter, the first verification parameter, and the file parameter algorithm identifier to the data server. Herein, the BIOS management server may carry a private key signature of the BIOS management server, and the first verification parameter and the file parameter algorithm identifier may carry a public key signature of the data server.

A manner of the data server verifying the validity and completeness of the BIOS flashing program, as well as a manner of processing after success or failure of verification, may be the same as a manner of the data server verifying the validity and completeness of the BIOS image file, as well as a manner of processing after success or failure of verification thereof, which shall not be reiterated herein.

According to an example embodiment of the present disclosure, through the aforementioned verification of the BIOS image file as well as the BIOS flashing procedure, which ensures that the BIOS image file and the BIOS flashing procedure are secure and reliable, flashing may be performed through the below-mentioned steps. If verification of either the BIOS image file or the BIOS flashing procedure fails, which is to say that the BIOS image file or the BIOS flashing procedure is non-secure or unreliable, execution of the steps of the example embodiment of the present disclosure after the verification activity may be stopped, ensuring security and reliability of data server.

Step 320, the data server performing BIOS flashing employing the BIOS image file.

Since the BIOS image file as well as the BIOS flashing program, having passed verification, each have completeness and validity, thereby the likelihood of the BIOS image file as well as the BIOS flashing program being altered or damaged is very low. Thus, the BIOS flashing program may be employed to flash the BIOS image file onto ROM of the data server.

Additionally, by the aforementioned it may be known that the flashed BIOS image file carries the private key signature of the BIOS management server, thereby facilitating subsequent operation and maintenance of data server based on the private key signature of the BIOS management server, further improving security and reliability of the data server.

Step 322, the data server signing the first file parameter based on the private key of the data server, and storing the first file parameter carrying the private key signature of the data server and/or sending the first file parameter carrying the private key signature of the data server to the BIOS management server.

Since even after the data server flashes the BIOS image file, the BIOS image file on the ROM may still be altered or damaged, therefore, to facilitate subsequent operation and maintenance of the data server, further improving reliability and security of the data server, the data server may, after successful flashing, sign the first file parameter of the BIOS management server through the private key of the data server, and store the first file parameter carrying the private key signature of the data server locally or send the first file parameter carrying the private key signature of the data server to the BIOS management server.

For example, the first file parameter of the BIOS image file flashed by the data server is hash(BIOS.ISO). Signing the first file parameter through the private key of the data server, that is, {hash(BIOSISO)}AIKpriv_c, produces hash_c={hash(BIOS.ISO)}AIKpriv_c. hash_c is stored in the NV (Non-Volatile) space of the TPM of the data server.

According to an example embodiment of the present disclosure, in order to ensure that the procedure of sending a first file parameter carrying the private key signature of the data server to the BIOS management server is secure and reliable, the data server may, based on the first verification parameter, generate a third verification parameter, and send the third verification parameter and the first file parameter carrying the private key signature of the data server to the BIOS management server, causing the BIOS management server to, based on the third verification parameter, verify that the first verification parameter has validity, and store the first file parameter carrying the private key signature of the data server. Correspondingly, if the BIOS management server fails to verify that the first verification parameter has validity, it may not store the first file parameter carrying the private key signature of the data server.

Herein, a manner of generating the third verification parameter based on the first verification parameter is the same as a manner of generating a first verification parameter based on a second verification parameter, which shall not be reiterated herein.

Of course, in practical applications, in order to further ensure security and reliability of transmitting and sending data to the BIOS management server, the data server may, based on the public key of the BIOS management server, sign the third verification parameter and the first file parameter carrying the private key of the data server. After the BIOS management server receives the above-mentioned data, the BIOS management server may verify the validity of the above-mentioned data based on the private key of the BIOS management server, that is, decrypt the above-mentioned data, thereby obtaining the third verification parameter and the first file parameter carrying the private key signature of the data server.

Additionally, in order to further ensure security and reliability of transmitting and sending data to the BIOS management server, the data server may further send other data at the same time as the third verification parameter and the first file parameter to the BIOS management server, such as a device identifier of the data server, a security certificate of the data server, and such data.

For example, the data server may send {C, n-3, hash_c}AIKpk_s to the BIOS management server, wherein, n-3 is a third verification parameter, generated by the data server based on n or n-2.

The BIOS management server may store the first file parameter carrying the private key signature of the data server in the aforementioned BIOS configuration file database.

For example, the BIOS management server stores hash_c, sent by the data server C, in the BIOS configuration file database as illustrated by Table 1 below. Herein, the first column is a device name of a data server, the second column is a device serial number of the data server, the third column is BIOS image file version information as flashed by the data server, the fourth column is a BIOS image file as flashed by the data server, and the fifth column is a first file parameter carrying the private key signature of the data server.

TABLE 1

| ... | ... ... | ... | ... |
|---|---|---|---|
| C | SN BIOS_Version | BIOS.ISO | {hash(BIOS.ISO)}AIKpriv_c |
| ... | ... ... | ... | ... |

According to an example embodiment of the present disclosure, first, the data server may send a BIOS image file obtaining request to the BIOS management server, the BIOS image file obtaining request carrying a second verification parameter. The BIOS management server may, based on the BIOS image file obtaining request, provide a BIOS image file, a first verification parameter generated based on the second verification parameter, as well as a first file parameter of the BIOS image file to the data server. Thereby, the data server may, through verifying that the first verification parameter has validity, ensure that the procedure of obtaining a BIOS image file is secure and reliable, and also, through verifying that the BIOS image file has completeness based on the first file parameter, determine the BIOS image file as complete, reducing the likelihood of the data server obtaining an altered or damaged BIOS image file. Therefore, the data server employs the BIOS image file that has passed verification to perform flashing, which may reduce the likelihood of flashing an altered or damaged BIOS image file, and improve security and reliability of the data server.

Second, the BIOS management server may sign the BIOS image file by a private key of the BIOS management server, thereby enabling the data server to verify the validity of the BIOS image file based on a public key of the BIOS management server, reducing the likelihood of the data server obtaining a BIOS image file from a risky source, ensuring that the procedure of obtaining the BIOS image file is secure and reliable, and reducing the likelihood of the data server obtaining an altered or damaged BIOS image file, thereby reducing the likelihood of the data server flashing an altered or damaged BIOS image file, further improving security and reliability of the data server.

Additionally, the BIOS management server may provide a security certificate of the BIOS management server to the data server, and since security certificates usually originate from PCAs and such reliable devices, thereby the data server may be enabled to, through verifying the validity of the security certificate, reduce the likelihood of the data server obtaining a BIOS image file from a risky source, ensure that the procedure of obtaining the BIOS image file is secure and reliable, and reduce the likelihood of the data server obtaining an altered or damaged BIOS image file, and thereby reduce the likelihood of the data server flashing an altered or damaged BIOS image file, further improving security and reliability of the data server.

Additionally, the BIOS management server may provide a file parameter algorithm identifier to the data server, and thereby the data server may, based on the file parameter algorithm identifier, accurately compute the second file parameter of the BIOS image file, ensuring that the data server may accurately compare the generated second file parameter with the first file parameter provided by the BIOS management server, improving the accuracy of the data server verifying the completeness of the BIOS image file, and also improving security and reliability of the obtained BIOS image file.

Additionally the BIOS management server may, through the private key of the BIOS management server, sign the BIOS image file provided to the data server, thereby facilitating subsequent operation and maintenance of the data server having the BIOS image file flashed thereunto, further improving security and reliability of the data server.

Additionally, after the data server flashes the BIOS image file, the first file parameter of the flashed BIOS image file may be stored or sent to the BIOS management server, where the first file parameter may carry therein the private key signature of the data server, facilitating subsequent operation of the flashed BIOS image file, further improving security and reliability of the data server.

Fourth Example Embodiment

Figure 4:
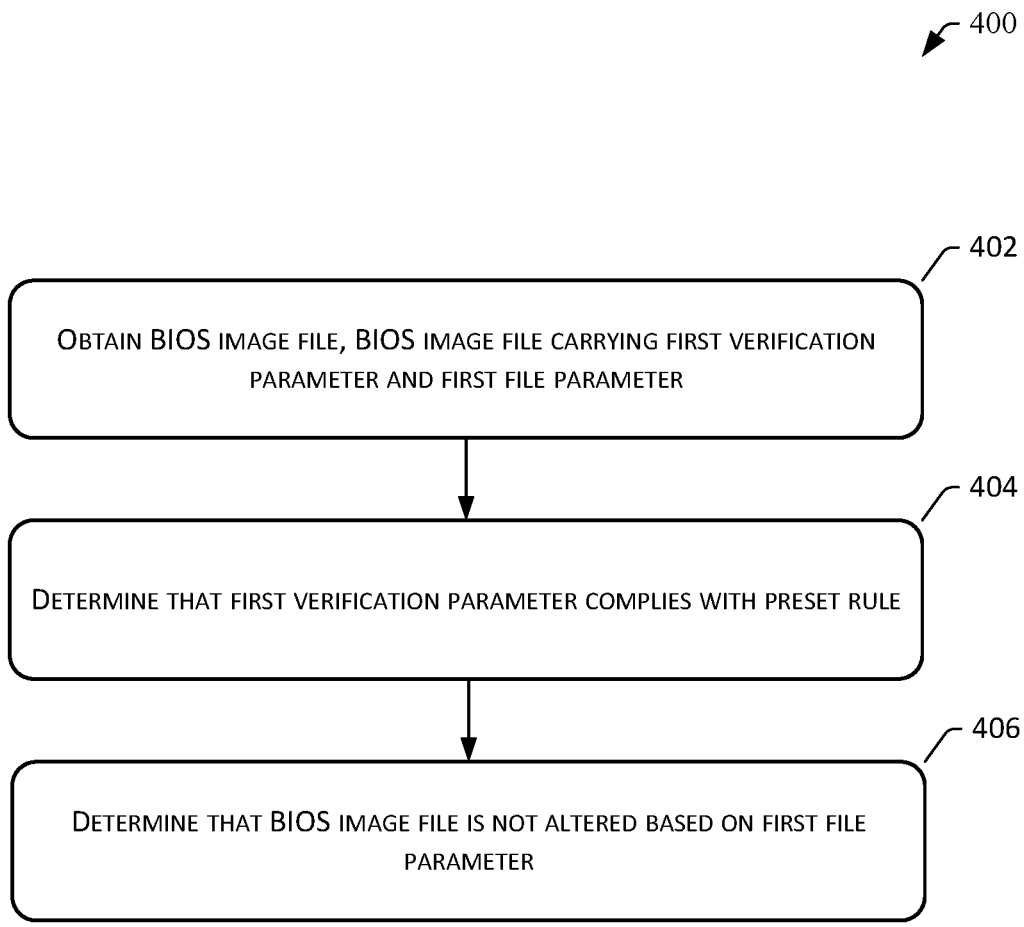
FIG. 4 illustrates a flowchart of a data processing method according to an example embodiment of the present disclosure.

Referring to FIG. 4, a flowchart of a data processing method 400 according to an example embodiment of the present disclosure is provided, particular steps thereof including:

Step 402, obtaining a BIOS image file, the BIOS image file carrying a first verification parameter and a first file parameter.

Since a computing device usually needs to obtain data from other devices, such as the computing device needing to obtain a BIOS image file from a BIOS management server, and the BIOS management server needing to obtain the BIOS image file from a BIOS vendor server, non-secure data (including data from non-secure sources or altered or damaged data) may precipitate security risks for the computing device. Therefore, to improve security and reliability of the computing device, the computing device may obtain data, where the data carries a first verification parameter and a first file parameter.

According to an example embodiment of the present disclosure, with a BIOS image file by way of example, in the description of the computing device obtaining data, obtained data is processed in accordance with the below-mentioned steps; in practical applications, with regard to any obtained data, the computing device may process the data according to a same fashion.

Herein, the first verification parameter and the first file parameter may refer to aforementioned related descriptions, which shall not be reiterated herein.

Step 404, determining that the first verification parameter complies with a preset rule.

Through verifying whether the first verification parameter complies with a preset rule, the first verification parameter may be determined as having validity, and thus the source of the aforementioned obtained BIOS image file or the procedure of obtaining the aforementioned BIOS image file is secure and reliable.

A preset rule is utilized to evaluate whether the first verification parameter is valid. The preset rule may be acquired in advance by the computing device, such as acquired from another device or acquired by receiving a user-submitted rule. When the first verification parameter complies with the preset rule, the first verification parameter may be determined as valid.

For example, wherein the computing device is a data server by way of example, when the first verification parameter is agreed upon in advance by the data server and the BIOA management server, the preset rule may be: consistency with a verification parameter agreed upon in advance. When the first verification parameter is generated based on a generation method agreed upon in advance by the data server and the BIOS management server, the preset rule may be: consistency with a verification parameter produced by the method agreed-upon in advance.

Of course, if the first verification parameter is determined as not complying with the preset rule, which is to say that the first verification parameter is invalid, the source of the obtained BIOS image file or the procedure of obtaining the BIOS image file may then be determined as non-secure. Now, the computing device may stop the subsequent processing flow, and through speech, text, images and such fashions, divulge to a user that the BIOS image file may pose a risk.

Step 406, based on the first file parameter, determining that the BIOS image file is not altered.

If the BIOS image file is not altered, which is to say that the entire content of the BIOS image file is complete, the likelihood that a Trojan horse, virus, and such non-secure factors are included therein may be very low, which it to say that the BIOS image file is secure and reliable. Thereby the computing device is facilitated in performing other processing upon the BIOS image file, such as storage or forwarding to other devices.

The computing device may generate a second file parameter of the BIOS image file, and compare the first file parameter with the second file parameter, determining the BIOS image file as not altered if they are consistent.

According to an example embodiment of the present disclosure, optionally, to enable the computing device to operate normally, improving security and reliability of the computing device, the computing device may employ the BIOS image file to perform BIOS flashing, reducing the likelihood of the computing device flashing an altered or damaged BIOS image file.

Herein, a manner of the computing device employing the BIOS image file to perform BIOS flashing may refer to aforementioned related descriptions, which shall not be reiterated herein.

According to an example embodiment of the present disclosure, since the obtained BIOS image file carries therein a first verification parameter and a first file parameter, therefore the first verification parameter may be determined as complying with a preset rule, and thereby the source of the obtained BIOS image file or the procedure of obtaining the BIOS image file may be determined as secure and reliable. Also, based on the first file parameter, the BIOS image file may be determined as not altered, and thereby the BIOS image file is determined as secure and reliable, reducing the likelihood of the computing device obtaining non-secure data, and improving security and reliability of the computing device.

Additionally, with regard to a BIOS image file already determined as secure, the computing device may employ the BIOS image file to perform BIOS flashing, thereby reducing the likelihood of the computing device flashing an altered or damaged BIOS image file, and improving security and reliability of the computing device.

Persons skilled in the art may realize that not all method steps of the above-mentioned example embodiments are essential, and in particular cases, one or more steps therein may be omitted, as long as the technical purpose of flashing a BIOS or processing a BIOS image file is realized. The present disclosure does not limit the number and ordering of steps of its example embodiments, and the scope of protection of the present disclosure shall be defined by the claims.

To facilitate persons skilled in the art in better understanding the present disclosure, BIOS flashing methods and BIOS image file processing methods of example embodiments of the present disclosure are described by several particular examples below:

First Example

Figure 5:
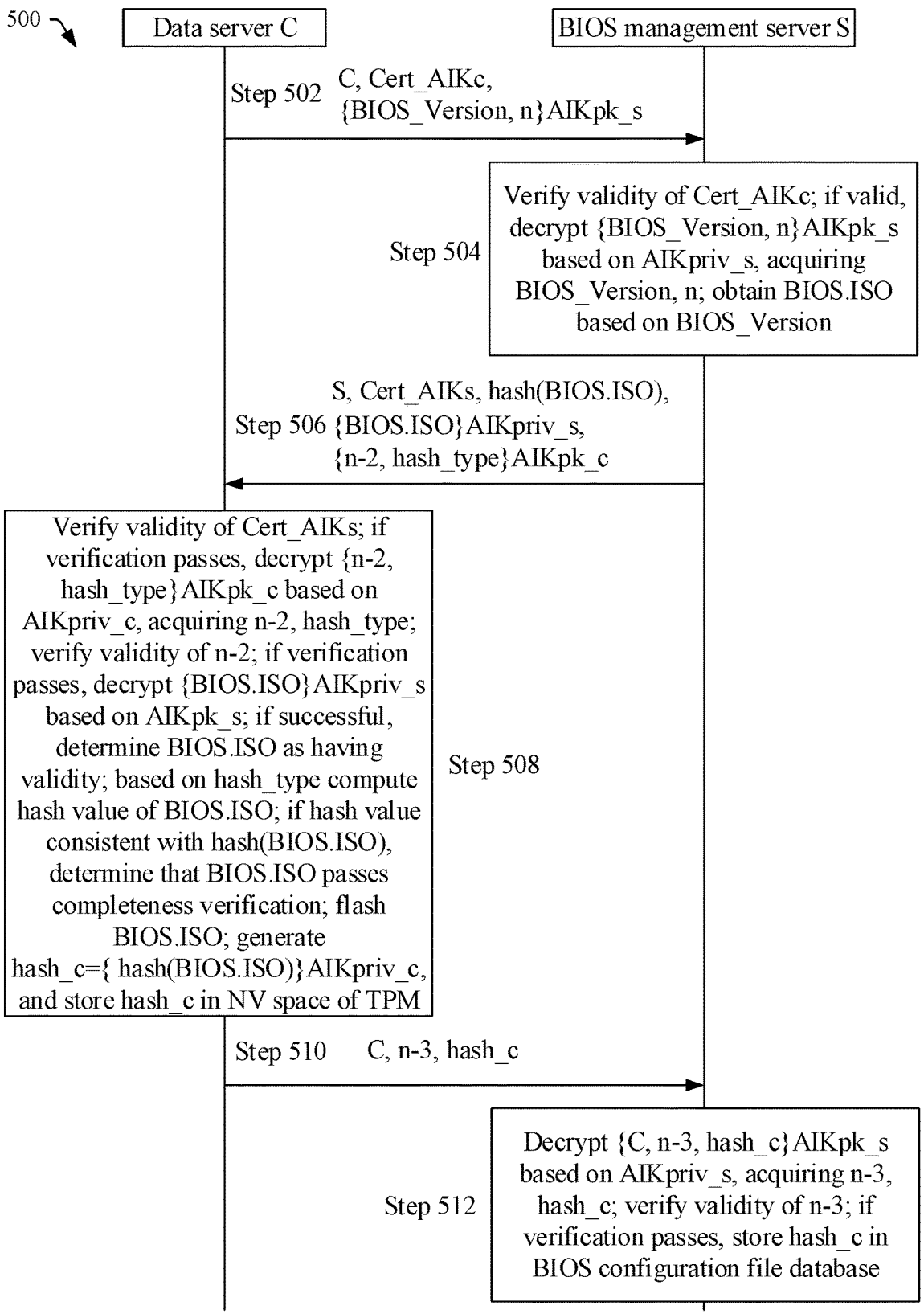
FIG. 5 illustrates a timing diagram of a BIOS flashing method according to an example embodiment of the present disclosure.

Referring to FIG. 5, a timing diagram of a BIOS flashing method 500 is provided, where the method may utilize interactions between data server C and BIOS management server S, particularly including the below steps:

Step 502, C sending to S [C, Cert_AIKc, {BIOS_Version, n}AIKpk_s].

Step 504, S receives the information sent by C, and verifying the validity of Cert_AIKc; if valid, then based on AIKpriv_s decrypting {BIOS_Version, n}AIKpk_s, acquiring BIOS_Version, n; based on BIOS_Version, obtaining BIOS.ISO.

Step 506, S sending to C [S, Cert_AIKs, hash(BIOS.ISO), {BIOS.ISO}AIKpriv_s, {n-2, hash_type}AIKpk_c].

Step 508, C receiving the information sent by S, and verifying the validity of Cert_AIKs; if verification passes, then based on AIKpriv_c decrypting {n-2, hash_type}AIKpk_c, acquiring n-2, hash_type; verifying the validity of n-2; if verification passes, then based on AIKpk_s decrypting {BIOS.ISO}AIKpriv_s; if successful, determining BIOS.ISO as having validity; based on hash_type computing a hash value of BIOS.ISO; if the hash value is consistent with hash(BIOS.ISO), determining that BIOS.ISO passes completeness verification; flashing BIOS.ISO; generating hash_c={hash(BIOS.ISO)}AIKpriv_c, and storing hash_c in NV space of a TPM.

Herein, the completeness and validity of a BIOS flashing program may be verified prior to flashing BIOS.ISO.

Step 510, C sending {C, n-3, hash_c}AIKpk_s to S.

Step 512, S receiving the information of C, and based on AIKpriv_s decrypting {C, n-3, hash_c}AIKpk_s, acquiring n-3, hash_c; verifying the validity of n-3; if verification passes, storing hash_c in a BIOS configuration file database.

Second Example

Figure 6:
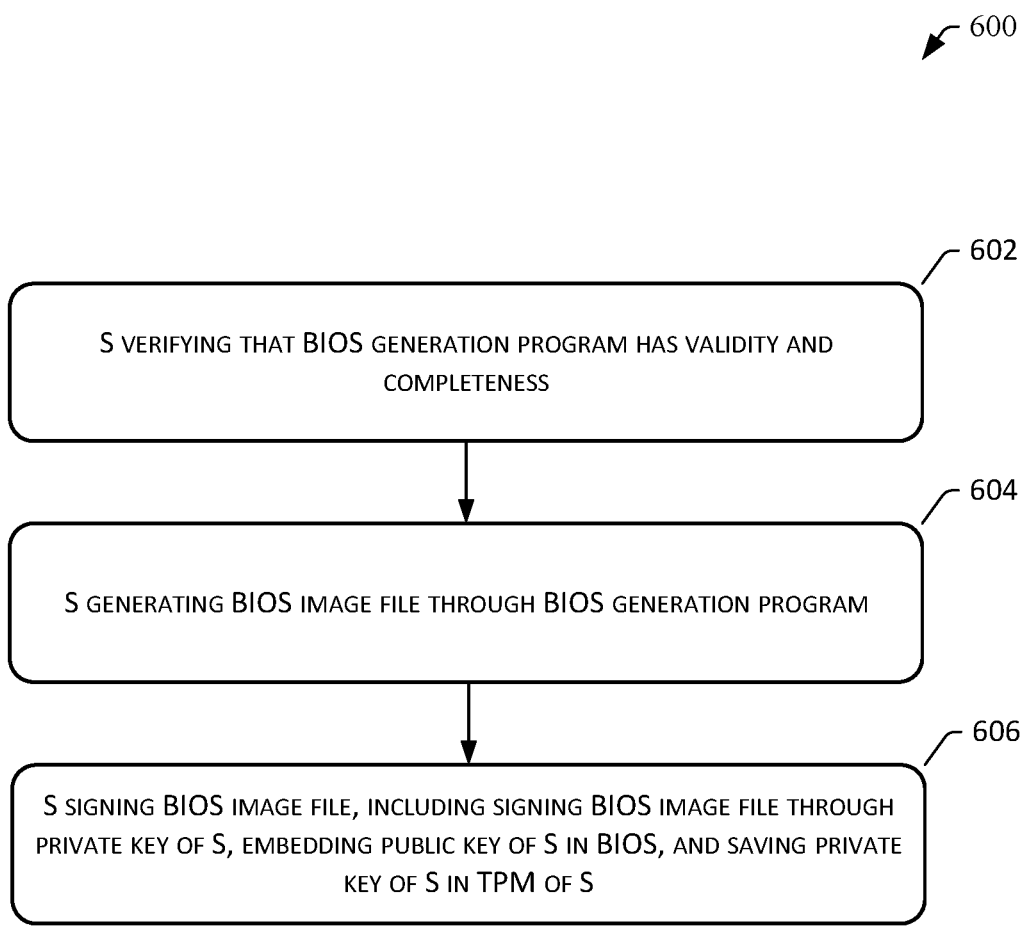
FIG. 6 illustrates a flowchart of a BIOS image file processing method according to an example embodiment of the present disclosure.

Referring to FIG. 6, a flowchart of a BIOS image file processing method 600 is provided, where the method may utilize BIOS management server S, particularly including the below steps:

Step 602, S verifying that a BIOS generation program has validity and completeness.

Step 604, S generating a BIOS image file through the BIOS generation program.

Additionally, if S obtains a vendor-provided BIOS image file from a BIOS vendor server, the aforementioned step of generating a BIOS image file may not be executed, and step 606 is directly executed based on the BIOS image file obtained from the BIOS vendor server.

Step 606, S signing the BIOS image file, including signing the BIOS image file through a private key of S, embedding a public key of S in the BIOS, and saving the private key of S in a TPM of S.

Herein, if the BIOS image file is provided by a BIOS vendor, the BIOS vendor server may employ a private key of the BIOS vendor server to sign the BIOS image file, that is, {BIOS.ISO}AIKpriv_oem, and providing image version information, a hash value, a hash value algorithm type, and the like of the BIOS image file. Thereby, S may decrypt {BIOS.ISO}AIKpriv_oem based on a public key of the BIOS vendor server, acquire BIOS.ISO, determine that BIOS.ISO is valid, based on the provided hash value algorithm type compute a hash value of BIOS.ISO, and compare the computed hash value with the provided hash value, which, if consistent, indicates that BIOS.ISO has completeness. After verification passes, step 603 may be executed, subsequently achieving the objective of autonomously controlling the BIOS.

Through the above first example and second example, the procedures of C obtaining a BIOS image file from S and performing flashing, and S providing a BIOS image file to C have been described. Next, through the third example and fourth example, with BIOS startup by way of example, the procedure of verifying the completeness and validity of a BIOS image file already flashed by C during subsequent operation procedures is described.

Third Example

Figure 7:
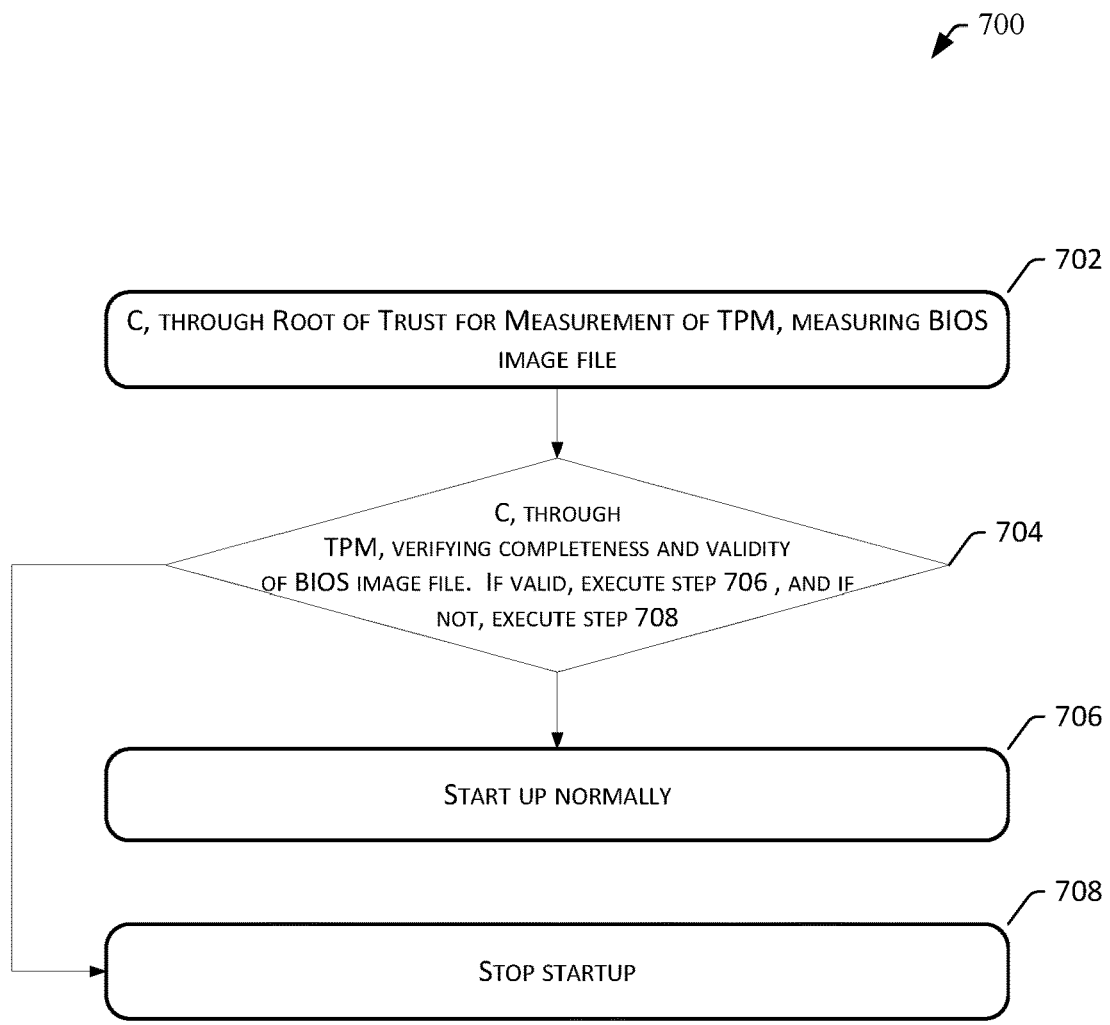
FIG. 7 illustrates a flowchart of a BIOS startup method according to an example embodiment of the present disclosure.

Referring to FIG. 7, a flowchart of a BIOS startup method 700 is provided, where the method may utilize data server C, particularly including the below steps:

Step 702, C, through a Root of Trust for Measurement of a TPM, measuring a BIOS image file, acquiring a hash value of the BIOS image file to be started up, that is, hash (BIOS.ISO), and through AIKpriv_c signing hash(BIOS.ISO) and acquiring {hash(BIOS.ISO)}AIKpriv_c.

Step 704, C verifying completeness and validity of the BIOS image file. If valid, step 706 is executed, and if not, step 708 is executed.

Herein, C may compare the aforementioned computed hash value with a hash value of the BIOS image file carrying the private key signature of C and stored in advance. If consistent, the verification result is determined as valid, and if inconsistent, the verification result is determined as invalid.

Step 706, starting up normally.

Step 708, stopping startup.

Fourth Example

Figure 8:
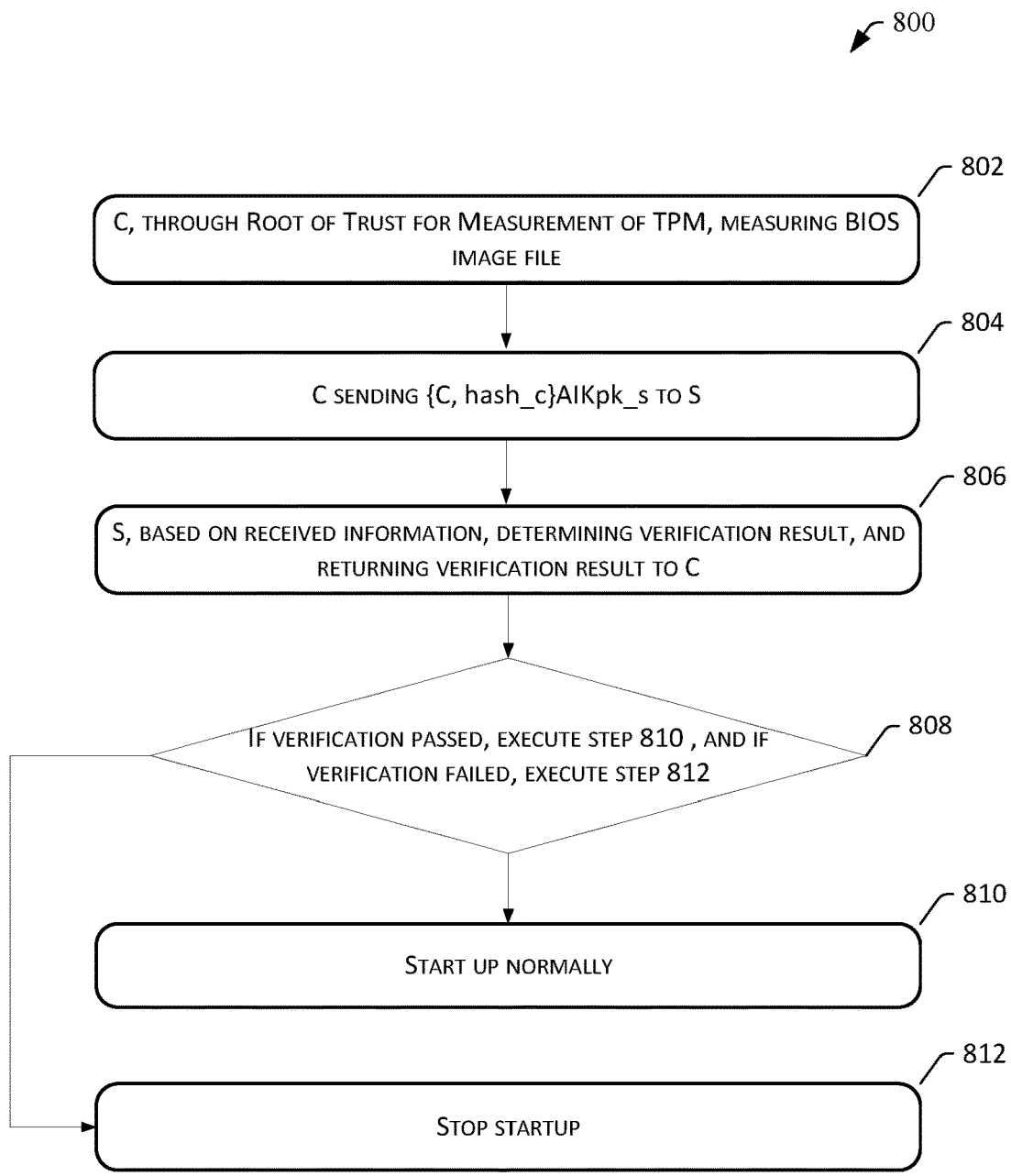
FIG. 8 illustrates a flowchart of another BIOS startup method according to an example embodiment of the present disclosure.

Referring to FIG. 8, a flowchart of BIOS startup method 800 is provided, where the method may be utilized in interactions between data server C and a BIOS management server, particularly including the below steps:

Step 802, C, through a Root of Trust for Measurement of a TPM, measuring the BIOS image file, acquiring a hash value of the BIOS image file to be started up, and through AIKpriv_c signing hash(BIOS.ISO) and acquiring {hash (BIOS.ISO)}AIKpriv_c, acquiring a measurement result, that is, hash_c.

Step 804, C sending {C, hash_c}AIKpk_s to S.

Step 806, S, based on the received information, determining a verification result, and returning the verification result to C.

Herein, after S receives {C, hash_c}AIKpk_s sent by C, based on decrypting {C, hash_c}AIKpk_s by AIKpriv_s, C and hash_c are acquired, and hash_c is compared with hash_c in a BIOS configuration file database; verification is determined as passed if they are consistent, and verification is determined as failed if they are not.

Step 808, if verification passed, executing step 810, and if verification failed, executing step 812.

Step 810, starting up normally.

Step 812, stopping startup.

Fifth Example Embodiment

Figure 9A:
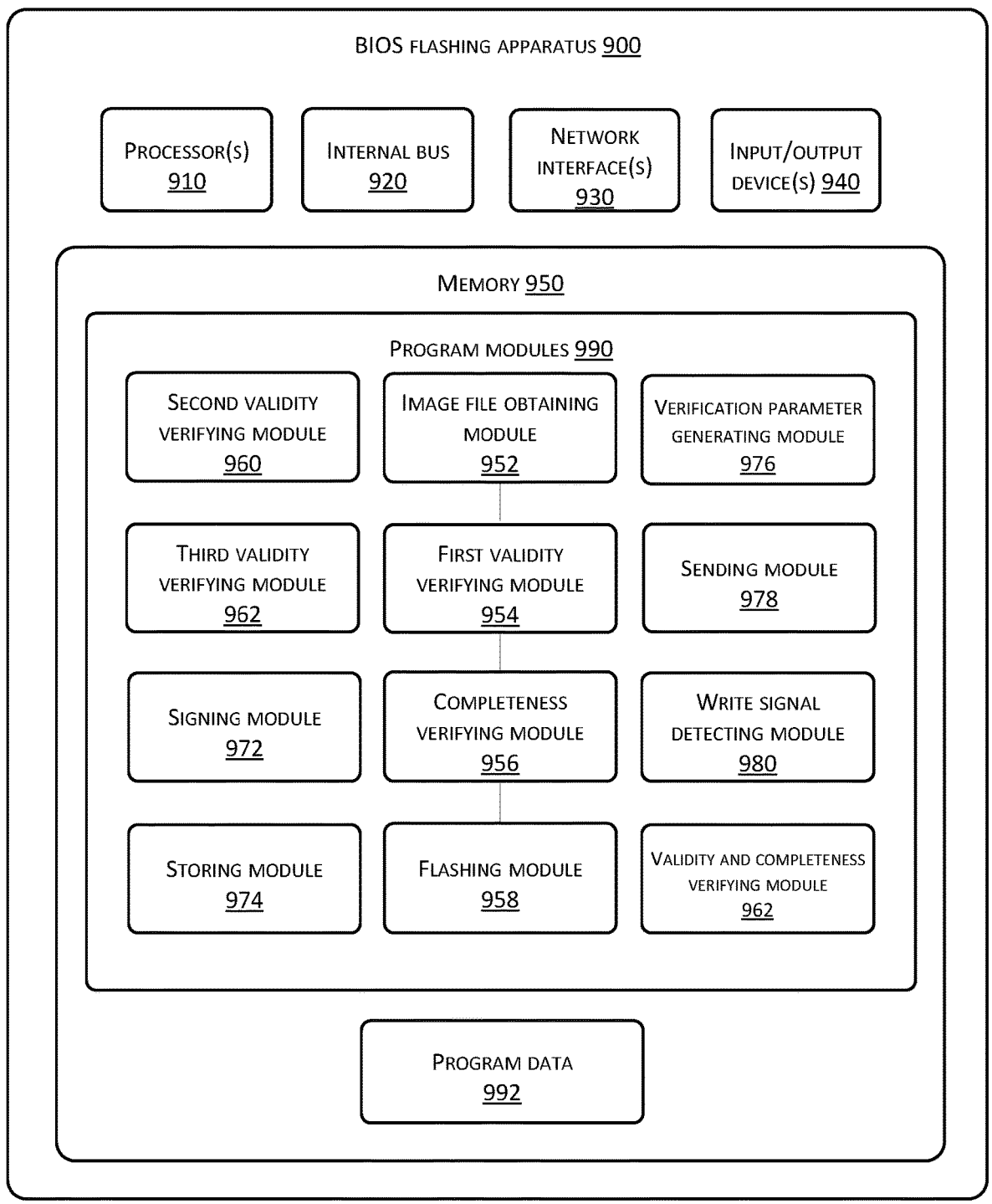
FIGS. 9A and 9B illustrate a BIOS flashing apparatus according to a fifth example embodiment of the present disclosure.
Figure 9B:
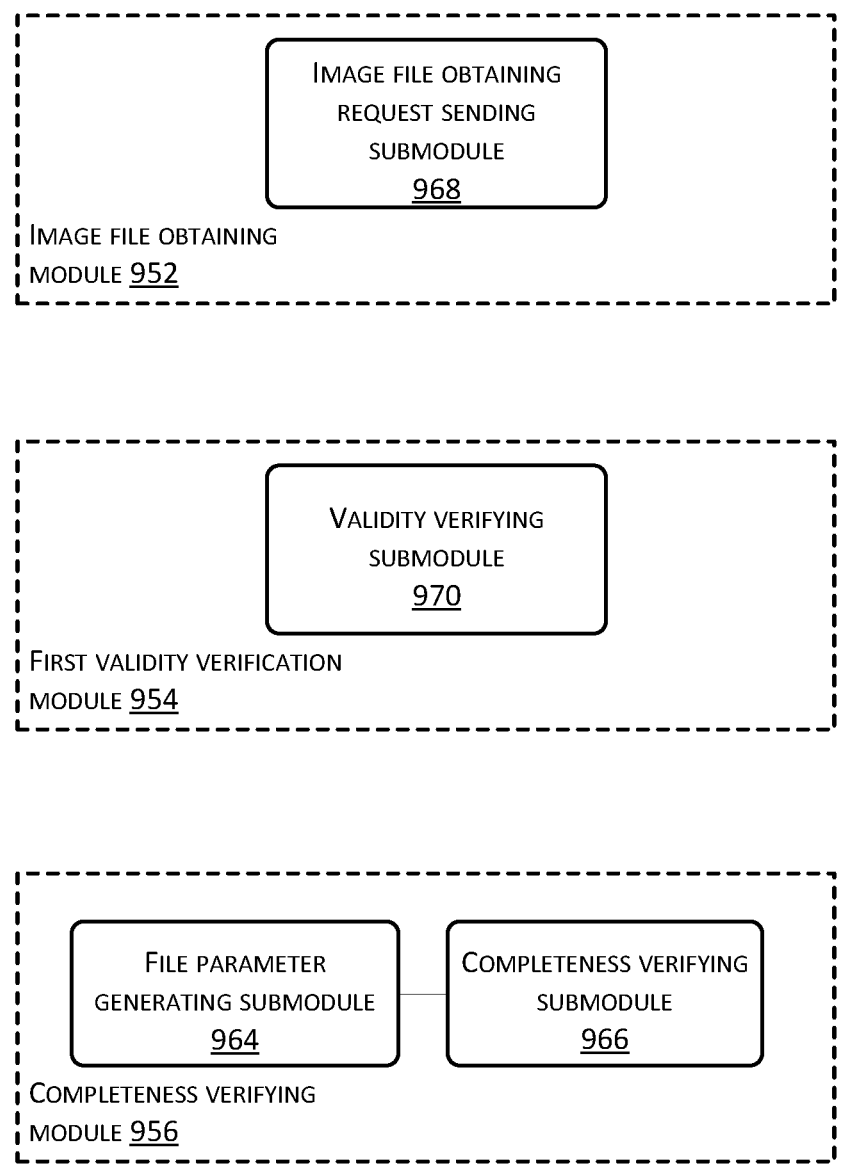

Referring to FIGS. 9A and 9B, a BIOS flashing apparatus 900 according to an example embodiment of the present disclosure is illustrated, particularly including: one or more processors 910, an internal bus 920, one or more network interfaces 930, one or more input/output devices 940, and memory 950. The apparatus 900 may further include an image file obtaining module 952, a first validity verifying module 954, a completeness verifying module 956, and a flashing module 958.

Memory 950 is operative to store program instructions and/or data.

One or more processors 910, through reading program instructions and/or data stored on memory 950, is operative to execute processes as follows:

The image file obtaining module 952 is stored in the memory 950 and configured to be executable by the one or more processors 910 to obtain a BIOS image file, the BIOS image file carrying a first verification parameter and a first file parameter;

The first validity verifying module 954 is stored in the memory 950 and configured to be executable by the one or more processors 910 to verify that the first verification parameter has validity;

The completeness verifying module 956 is stored in the memory 950 and configured to be executable by the one or more processors 910 to, based on the first file parameter, verify that the BIOS image file has completeness;

The flashing module 958 is stored in the memory 950 and configured to be executable by the one or more processors 910 to employ the BIOS image file to perform BIOS flashing.

Optionally, the BIOS image file further carries a private key signature of a BIOS management server, and the apparatus 900 further includes:

A second validity verifying module 960 stored in the memory 950 and configured to be executable by the one or more processors 910 to, based on a public key of the BIOS management server, verify that the BIOS image file has validity.

Optionally, the BIOS image file further carries a security certificate of a BIOS management server, and the apparatus 900 further includes:

A third validity verifying module 962 stored in the memory 950 and configured to be executable by the one or more processors 910 to verify that the security certificate of the BIOS management server has validity.

Optionally, the completeness verifying module 956 includes (see FIG. 9B):

A file parameter generating submodule 964 stored in the memory 950 and configured to be executable by the one or more processors 910 to, based on the BIOS image file, generate a second file parameter; and A completeness verifying submodule 966 stored in the memory 950 and configured to be executable by the one or more processors 910 to verify that the second file parameter and the first file parameter are consistent, wherein if consistent, the BIOS image file has completeness.

Optionally, the BIOS image file further carries a file parameter algorithm identifier, and the file parameter generating submodule 964 is further configured to be executable by the one or more processors 910 to:

Based on the file parameter algorithm identifier and the BIOS image file, generate the second file parameter.

Optionally, the image file obtaining module 952 further includes (see FIG. 9B):

An image file obtaining request sending submodule 968 stored in the memory 950 and configured to be executable by the one or more processors 910 to send a BIOS image file obtaining request to a BIOS management server, the BIOS image file obtaining request carrying a second verification parameter and BIOS image file version information, the first verification parameter being generated based on the second verification parameter;

The first validity verifying module 954 includes (see FIG. 9B):

A validity verifying submodule 970 stored in the memory 950 and configured to be executable by the one or more processors 910 to, based on the second verification parameter, verify that the first verification parameter has validity.

Optionally, the apparatus 900 further includes:

A signing module 972 stored in the memory 950 and configured to be executable by the one or more processors 910 to, based on a private key of the data server, sign the first file parameter;

A storing module 974 stored in the memory 950 and configured to be executable by the one or more processors 910 to store the private key signature of the data server and the first file parameter.

Optionally, the apparatus 900 further includes:

A verification parameter generating module 976 stored in the memory 950 and configured to be executable by the one or more processors 910 to, based on the first verification parameter, generate a third verification parameter;

A sending module 978 stored in the memory 950 and configured to be executable by the one or more processors 910 to send the third verification parameter and the first file parameter carrying the private key signature of the data server to the BIOS management server, to cause the BIOS management server to, based on the third verification parameter, verify that the first verification parameter has validity, and store the first file parameter carrying the private key signature of the data server.

Optionally, the apparatus 900 further includes:

A write signal detecting module 980 stored in the memory 950 and configured to be executable by the one or more processors 910 to detect a flash write signal.

Optionally, the apparatus 900 further includes:

A validity and completeness verifying module 982 stored in the memory 950 and configured to be executable by the one or more processors 910 to verify that a BIOS flashing program has validity and completeness.

An embodiment of the present application further discloses a computer readable storage medium, wherein the computer readable storage medium stores instructions which, when running on a computer, enable the computer to perform the processes described above.

The memory 950 may include a form of computer readable media such as a volatile memory, a random access memory (RAM) and/or a non-volatile memory, for example, a read-only memory (ROM) or a flash RAM. The memory 950 is an example of a computer readable medium.

In implementations, the memory 950 may include program modules 990 and program data 992. The program modules 992 may include one or more of the modules as described above.

According to an example embodiment of the present disclosure, a BIOS image file may be obtained, the BIOS image file carrying a first verification parameter as well as a first file parameter generated based on the BIOS image file. Therefore, through verifying that the first verification parameter has validity, thereby a procedure of obtaining the BIOS image file is determined as secure and reliable, and through verifying that the BIOS image file has completeness based on the first file parameter, thereby the obtained BIOS image file is determined as complete. So, through performing flashing through the verified BIOS image file, the likelihood of flashing an altered or damaged BIOS image file may be reduced, and security and reliability of the data server are improved.

Sixth Example Embodiment

Figure 10A:
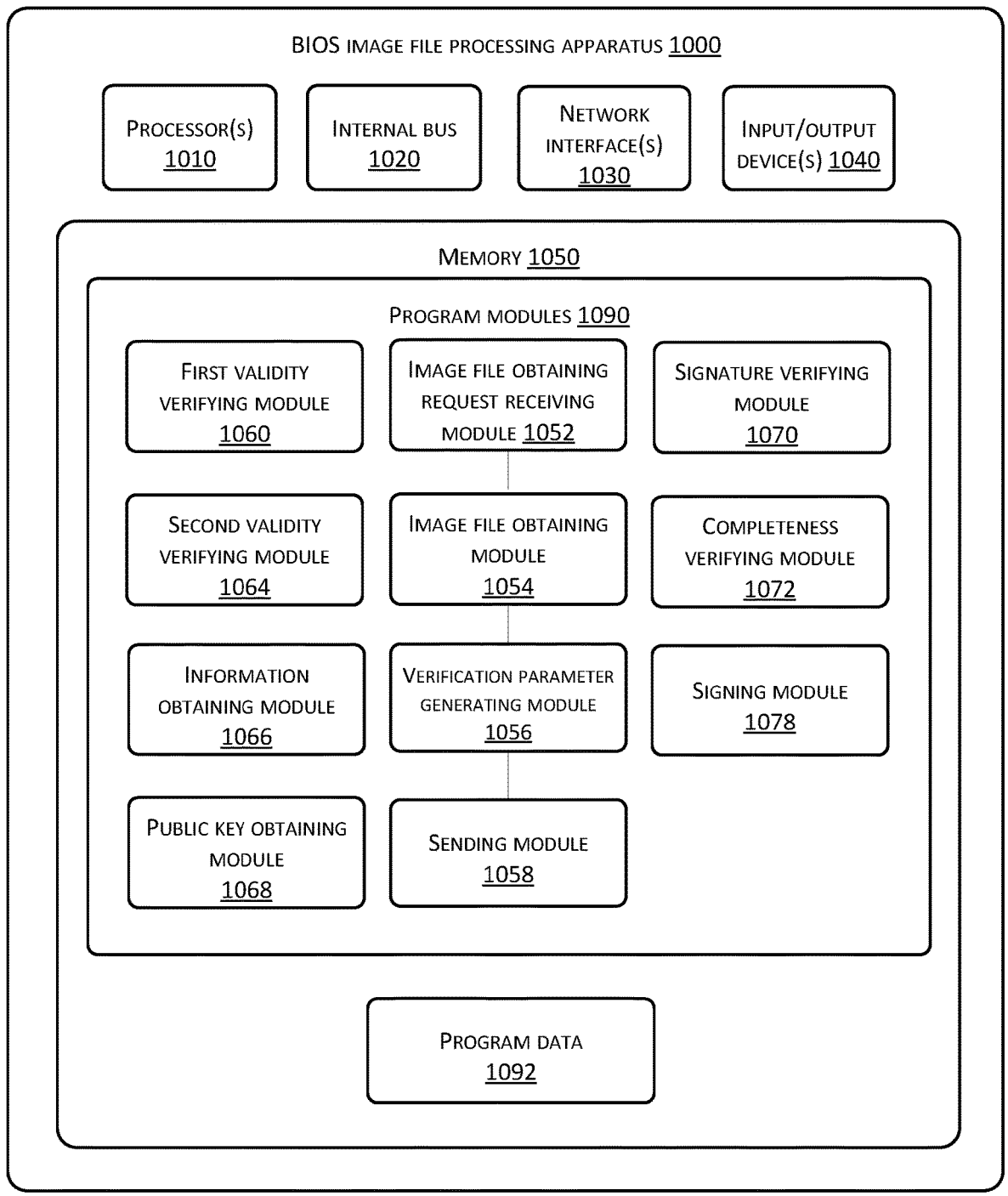
FIGS. 10A and 10B illustrates a BIOS image file processing apparatus according to a sixth example embodiment of the present disclosure.
Figure 10B:
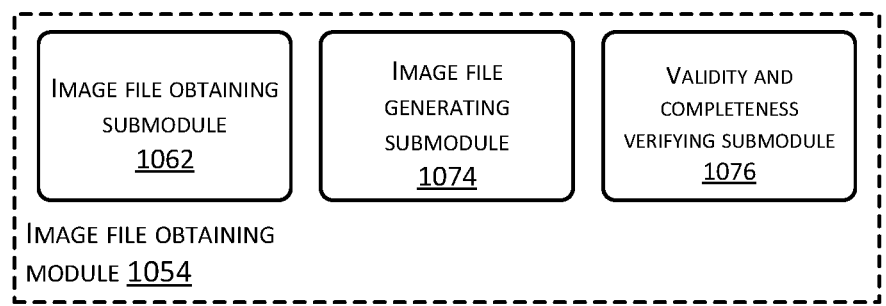

Referring to FIGS. 10A and 10B, a BIOS image file processing apparatus 1000 according to an example embodiment of the present disclosure is illustrated, particularly including: one or more processors 1010, an internal bus 1020, one or more network interfaces 1030, one or more input/output devices 1040, and memory 1050. The apparatus 1000 may further include an image file obtaining request receiving module 1052, an image file obtaining module 1054, a verification parameter generating module 1056, and a sending module 1058.

Memory 1050 is operative to store program instructions and/or data.

One or more processors 1010, through reading program instructions and/or data stored on memory 1050, is operative to execute processes as follows:

The image file obtaining request receiving module 1052 is stored in the memory 1050 and configured to be executable by the one or more processors 1010 to receive a BIOS image file obtaining request, the BIOS image file obtaining request carrying a second verification parameter;

The image file obtaining module 1054 is stored in the memory 1050 and configured to be executable by the one or more processors 1010 to obtain a BIOS image file and generate a first file parameter of the BIOS image file;

The verification parameter generating module 1056 is stored in the memory 1050 and configured to be executable by the one or more processors 1010 to based on the second verification parameter, generate a first verification parameter;

The sending module 1058 is stored in the memory 1050 and configured to be executable by the one or more processors 1010 to send the first file parameter, the first verification parameter, as well as the BIOS image file together to the data server, causing the data server to verify that the first verification parameter has validity, as well as verify, based on the first file parameter, that the BIOS image file has completeness.

Optionally, the BIOS image file obtaining request further carries a security certificate of the data server, and the apparatus 1000 further includes:

A first validity verifying module 1060 stored in the memory 1050 and configured to be executable by the one or more processors 1010 to verify that the security certificate of the data server has validity.

Optionally, the BIOS image file obtaining request further carries BIOS image file version information, and the image file obtaining module 1054 includes (see FIG. 10B):

An image file obtaining submodule 1062 stored in the memory 1050 and configured to be executable by the one or more processors 1010 to, based on the BIOS image file version information, obtain the BIOS image file.

Optionally, the BIOS image file version information and the second verification parameter carry a public key signature of the BIOS management server, and the apparatus 1000 further includes:

A second validity verifying module 1064 stored in the memory 1050 and configured to be executable by the one or more processors 1010 to, based on a private key signature of the BIOS management server, verify that the BIOS image file version information and the second verification parameter have validity.

Optionally, the apparatus 1000 further includes:

An information obtaining module 1066 stored in the memory 1050 and configured to be executable by the one or more processors 1010 to obtain BIOS-related information provided by a BIOS vendor server, the BIOS-related information including at least one of vendor server information and BIOS image file version information;

A public key obtaining module 1068 stored in the memory 1050 and configured to be executable by the one or more processors 1010 to, based on the BIOS-related information, obtain a required public key from multiple types of public keys of the BIOS vendor server, the BIOS image file carrying a signature generated by a private key corresponding to the source BIOS vendor server;

A signature verifying module 1070 stored in the memory 1050 and configured to be executable by the one or more processors 1010 to perform signature verification upon the BIOS image file employing the obtained public key.

Optionally, the BIOS-related information further includes a first file parameter of the BIOS image file, and the apparatus 1000 further includes:

A completeness verifying module 1072 stored in the memory 1050 and configured to be executable by the one or more processors 1010 to, based on the first file parameter, verify that the BIOS image file has completeness.

Optionally, the image file obtaining module 1054 further includes (see FIG. 10B):

An image file generating submodule 1074 stored in the memory 1050 and configured to be executable by the one or more processors 1010 to generate the BIOS image file, and, based on the generated BIOS image file, generate a corresponding first file parameter.

Optionally, the image file obtaining module 1054 further includes:

A validity and completeness verifying submodule 1076 stored in the memory 1050 and configured to be executable by the one or more processors 1010 to verify that a BIOS generating program has validity and completeness.

Optionally, the apparatus 1000 further includes:

A signing module 1078 stored in the memory 1050 and configured to be executable by the one or more processors 1010 to, based on the private key of the BIOS management server, sign the BIOS image file and the first file parameter, causing the data server to, based on a public key of the BIOS management server, verify that the BIOS image file and the first file parameter have validity.

An embodiment of the present application further discloses a computer readable storage medium, wherein the computer readable storage medium stores instructions which, when running on a computer, enable the computer to perform the processes described above.

The memory 1050 may include a form of computer readable media such as a volatile memory, a random access memory (RAM) and/or a non-volatile memory, for example, a read-only memory (ROM) or a flash RAM. The memory 1050 is an example of a computer readable medium.

In implementations, the memory 1050 may include program modules 1090 and program data 1092. The program modules 1092 may include one or more of the modules as described above.

According to an example embodiment of the present example embodiment, a BIOS image file obtaining request may be obtained, thereby generating a first verification parameter based on a second verification parameter carried by the BIOS image file, therefore ensuring that the data server obtaining the BIOS image file may, through verifying that the first verification parameter has validity, thereby determine that a procedure of obtaining the BIOS image file is secure and reliable, as well as, through verifying that the BIOS image file has completeness based on the first file parameter, reduce the likelihood of the data server obtaining an altered or damaged BIOS image file, thereby also reducing the likelihood of the data server flashing and starting up an altered or damaged BIOS image file, and thereby improving security and reliability of the data server.

Seventh Example Embodiment

Figure 11:
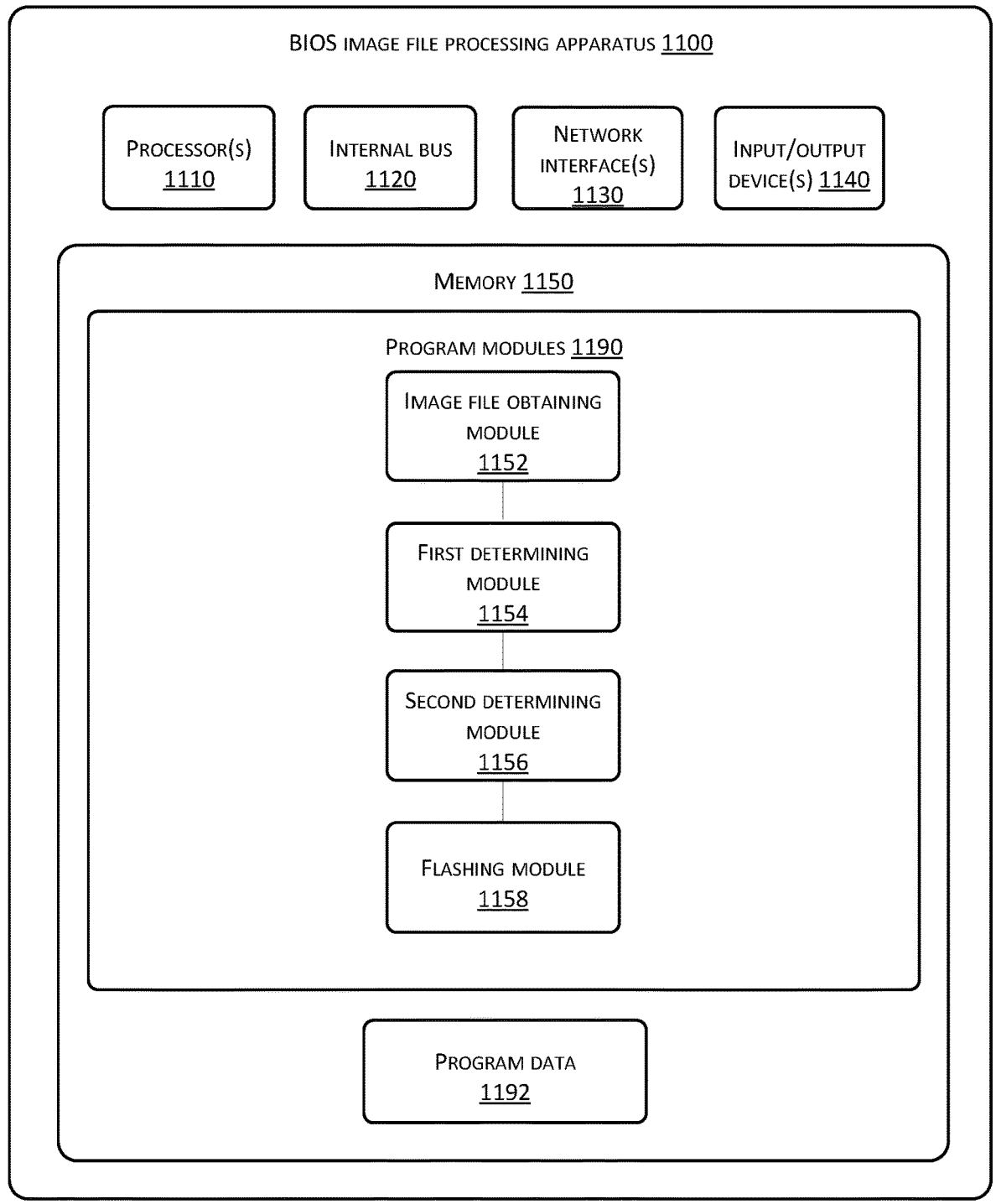
FIG. 11 illustrates a BIOS image file processing apparatus according to a seventh example embodiment of the present disclosure.

Referring to FIG. 11, a BIOS image file processing apparatus 1100 according to an example embodiment of the present disclosure is illustrated, particularly including: one or more processors 1110, an internal bus 1120, one or more network interfaces 1130, one or more input/output devices 1140, and memory 1150. The apparatus 1100 may further include an image file obtaining module 1152, a first determining module 1154, and a second determining module 1156.

Memory 1150 is operative to store program instructions and/or data.

One or more processors 1110, through reading program instructions and/or data stored on memory 1150, is operative to execute processes as follows:

The image file obtaining module 1152 is stored in the memory 1150 and configured to be executable by the one or more processors 1110 to obtain a BIOS image file, the BIOS image file carrying a first verification parameter and a first file parameter;

The first determining module 1154 is stored in the memory 1150 and configured to be executable by the one or more processors 1110 to determine that the first verification parameter complies with a preset rule;

The second determining module 1156 is stored in the memory 1150 and configured to be executable by the one or more processors 1110 to, based on the first file parameter, determine that the BIOS image file is not altered.

Optionally, the apparatus 1100 further includes:

A flashing module 1158 stored in the memory 1150 and configured to be executable by the one or more processors 1110 to employ the BIOS image file to perform BIOS flashing.

An embodiment of the present application further discloses a computer readable storage medium, wherein the computer readable storage medium stores instructions which, when running on a computer, enable the computer to perform the processes described above.

The memory 1150 may include a form of computer readable media such as a volatile memory, a random access memory (RAM) and/or a non-volatile memory, for example, a read-only memory (ROM) or a flash RAM. The memory 1150 is an example of a computer readable medium.

In implementations, the memory 1150 may include program modules 1190 and program data 1192. The program modules 1192 may include one or more of the modules as described above.

According to an example embodiment of the present disclosure, since the obtained BIOS image file carries therein a first verification parameter and a first file parameter, therefore the first verification parameter may be determined as complying with a preset rule, and thereby the source of the obtained BIOS image file or the procedure of obtaining the BIOS image file may be determined as secure and reliable. Also, based on the first file parameter, the BIOS image file may be determined as not altered, and thereby the BIOS image file is determined as secure and reliable, reducing the likelihood of the computing device obtaining non-secure data, and improving security and reliability of the computing device.

Memory of the above-mentioned example embodiments is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Apparatus example embodiments herein are described in relatively simple terms, since other method example embodiments are essentially similar, and reference to related portions of the method example embodiments shall suffice for description.

Figure 12:
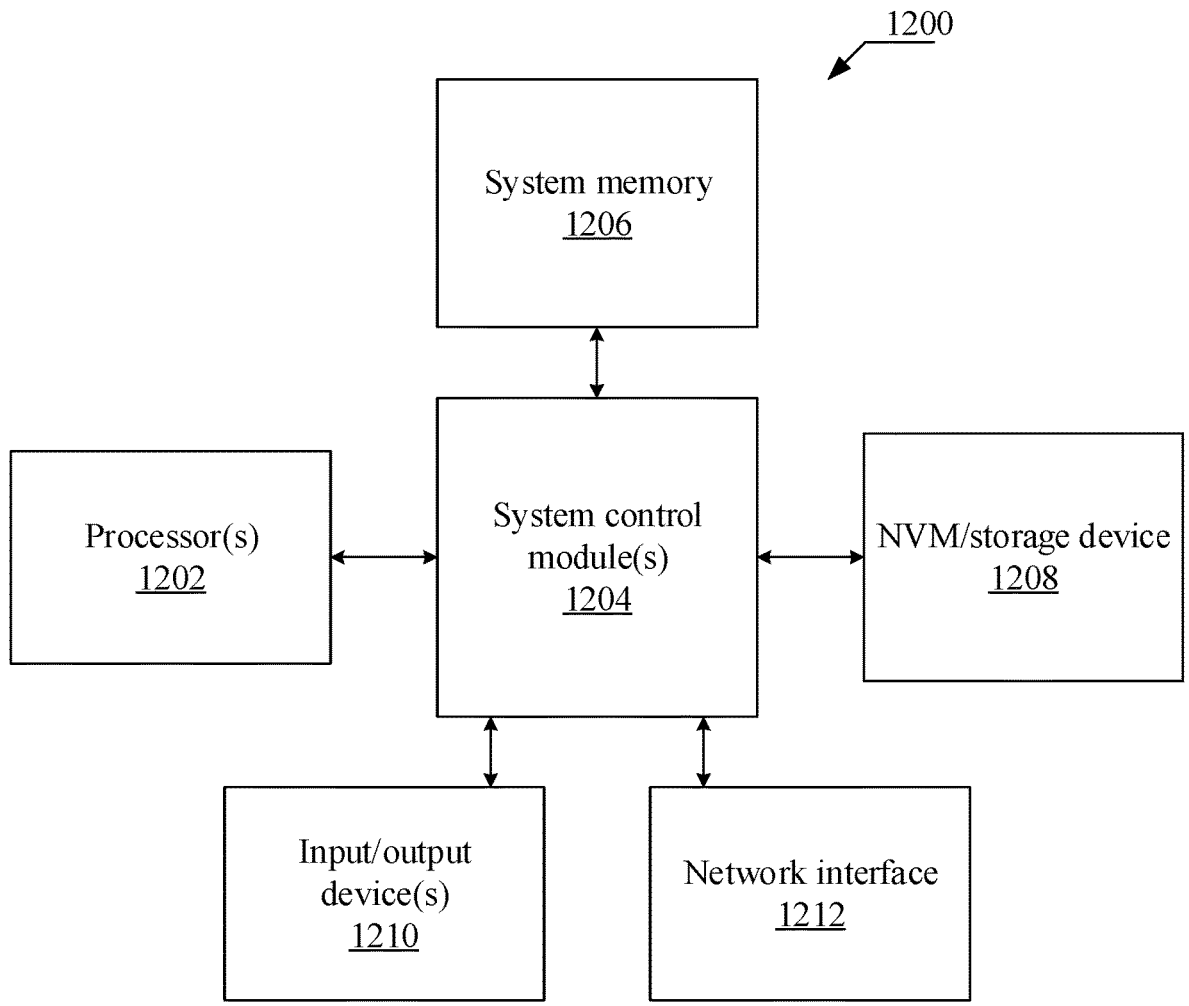
FIG. 12 illustrates a schematic diagram of an example system according to an example embodiment of the present disclosure.

Example embodiments of the present disclosure may be implemented using any suitable hardware, firmware, software, or any combination thereof to achieve a desired system configuration. FIG. 12 schematically illustrates an exemplary system (or apparatus) 1200 which may be utilized to implement each example embodiment as described in the present disclosure.

With regard to an example embodiment, FIG. 12 illustrates an exemplary system 1200, the system having one or more processor(s) 1202, coupled to at least one system control module(s) (chipset(s)) 1204 of the one or more processor(s) 1202, coupled to system memory 1206 of the system control module(s) 1204, coupled to non-volatile memory (NVM)/a storage device 1208 of the system control module(s) 1204, coupled to one or more input/output devices 1210 of the system control module(s) 1204, and being coupled to a network interface 1212 of the system control module(s) 1204.

The processor(s) 1202 may include one or more single-core or multicore processors. The processor(s) 1202 may include any given combinations of general purpose processors or dedicated processors (such as graphics processors, application processors, baseband processors and the like). According to some example embodiments, the system 1200 may serve as a data server or a BIOS management server according to example embodiments of the present disclosure.

According to some example embodiments, the system 1200 may include one or more computer-readable media (such as the system memory 1206 or the NVM/storage device 1208) having instructions thereon, the one or more processor(s) 1202 being configured to, in conjunction with the one or more computer-readable media, execute instructions to implement modules which execute acts according to the present disclosure.

With regard to an example embodiment, the system control module(s) 1204 may include any suitable interface controller, to provide any suitable interfaces for at least one of the one or more processor(s) 1202 and/or for any suitable devices or combinations which the system control module(s) 1204 are in communication with.

The system control module(s) 1204 may include a memory controller module, providing an interface for the system memory 1206. The memory controller module may be a hardware module, software module and/or firmware module.

The system memory 1206 may be utilized to, for example, load and/or store data and/or instructions for the system 1200. According to an example embodiment, the system memory 1206 may include any suitable volatile memory, for example, suitable DRAM. According to some example embodiments, the system memory 1206 may include double data rate fourth-generation synchronous dynamic random-access memory (DDR4 SDRAM).

According to an example embodiment, the system controller module(s) 1204 may include one or more input/output controller, providing interfaces for the NVM/storage device 1208 and one or more input/output device(s) 1210.

For example, the NVM/storage device 1208 may be utilized to store data and/or instructions. The NVM/storage device 1208 may include any suitable non-volatile memory (for example, flash memory) and/or may include any suitable one or more non-volatile storage device (for example, one or more hard disk drive(s) (HDD)), one or more compact disc(s) (CD) drive and/or one or more digital versatile disc(s) (DVD)).

The NVM/storage device 1208 may include part of the storage resources of devices physically installed on the system 1200, or may be accessed by the devices and not necessarily being part of those devices. For example, the NVM/storage device 1208 may be accessed through a network via one or more input/output device(s) 1210.

One or more input/output device(s) 1210 may provide interfaces and any other suitable device communication for the system 1200. The input/output device(s) 1210 may include communication components, audio components, sensor components, and the like. The network interface 1212 may provide interfaces for the system 1200 to communicate through one or more network(s), and the system may, based on any standards and/or protocols among one or more wireless network standard(s) and/or protocol(s) to conduct wireless communication with one or more component(s) of a wireless network; for example, accessing a wireless network based on communication standards such as Wi-Fi, 2G or 3G, or combinations thereof to conduct wireless communication.

With regard to an example embodiment, the logic of one or more controller(s) (for example, a memory controller module) of the at least one system controller module(s) 1204 of the one or more processor(s) 1202 is packaged together. With regard to an example embodiment, the logic of one or more controller(s) of the at least one system controller module(s) 1204 of the one or more processor(s) 1202 packaged together forms a System-in-Package (SiP). With regard to an example embodiment, the logic of one or more controller(s) of the at least one system controller module(s) 1204 of the one or more processor(s) 1202 is integrated onto the same mold. With regard to an example embodiment, the logic of one or more controller(s) of the at least one system controller module(s) 1204 of the one or more processor(s) 1202 integrated onto the same mold forms a System on Chip (SoC).

According to various example embodiments, the system 1200 may be, but is not limited to: a workstation, a desktop computing device or a mobile computing device (for example, a laptop computing device, a handheld computing device, a tablet computer, a Netbook and the like). According to various example embodiments, the system 1200 may have more or fewer components and/or different architectures. For example, according to some example embodiments, the system 1200 includes one or more cameras, keyboards, liquid crystal display monitor (LCD) screens (including touchscreen displays), non-volatile memory ports, multiple antennas, graphics chips, application-specific integrated circuits (ASIC), and speakers.

Herein, if a monitor includes a touch panel, the monitor may be implemented as a touchscreen display, to receive input signals from users. A touch panel includes one or more touch-sensitive sensors which sense touch, sliding and gestures upon the touch panel. The touch-sensitive sensors may not merely sense the boundaries of touch or sliding motions, but also detect continuous times and pressure related to the touch or sliding operations.

Example embodiments of the present disclosure further provide a non-volatile computer-readable storage medium, the storage medium having stored thereon one or more modules (programs), where the one or more modules applied to a terminal device may cause the terminal device to execute instructions of method steps according to example embodiments of the present disclosure.

An example provides an apparatus, including: one or more processor(s); and, one or more machine-readable medium(s) having instructions stored thereon, which, when executed by the one or more processor(s), cause the apparatus to execute methods executed by a data server or a BIOS management server according to example embodiments of the present disclosure.

An example provides one or more machine-readable medium(s) having stored thereon instructions which, when executed by one or more processor(s), cause the apparatus to execute methods executed by a data server or a BIOS management server according to example embodiments of the present disclosure.

Example embodiments of the present disclosure disclose BIOS flashing methods, BIOS image file processing methods and BIOS startup methods.

Example 1, a BIOS flashing method, includes:

obtaining a BIOS image file, the BIOS image file carrying a first verification parameter and a first file parameter;

verifying that the first verification parameter has validity;

based on the first file parameter, verifying that the BIOS image file has completeness; and employing the BIOS image file verified as having completeness to perform BIOS flashing.

Example 2 may include the method of example 1, wherein the first file parameter is generated based on the BIOS image file.

Example 3 may include the method of example 1, wherein the BIOS image file further carries a private key signature of a BIOS management server, and the method further includes:

based on a public key of the BIOS management server, verifying that the BIOS image file has validity.

Example 4 may include the method of example 1, wherein the BIOS image file further carries a security certificate of a BIOS management server, and the method further includes:

verifying that the security certificate of the BIOS management server has validity.

Example 5 may include the method of example 1, wherein based on the first file parameter, verifying that the BIOS image file has completeness includes:

based on the BIOS image file, generating a second file parameter; and verifying that the second file parameter and the first file parameter are consistent, wherein if consistent, the BIOS image file has completeness.

Example 6 may include the method of example 5, wherein the BIOS image file further carries a file parameter algorithm identifier, and based on the BIOS image file, generating a second file parameter includes:

based on the file parameter algorithm identifier and the BIOS image file, generating the second file parameter.

Example 7 may include the method of example 1, wherein after employing the BIOS image file to perform BIOS flashing, the method further includes:

sending a BIOS image file obtaining request to a BIOS management server, the BIOS image file obtaining request carrying a second verification parameter and BIOS image file version information, the first verification parameter being generated based on the second verification parameter; and verifying that the first verification parameter has validity includes:

based on the second verification parameter, verifying that the first verification parameter has validity.

Example 8 may include the method of example 1, wherein after employing the BIOS image file to perform BIOS flashing, the method further includes:

based on a private key of the data server, signing the first file parameter; and storing the private key signature of the data server and the first file parameter.

Example 9 may include the method of example 8, wherein the method further includes:

based on the first verification parameter, generating a third verification parameter; and sending the third verification parameter and the first file parameter carrying the private key signature of the data server to the BIOS management server, to cause the BIOS management server to, based on the third verification parameter, verify that the first verification parameter has validity, and store the first file parameter carrying the private key signature of the data server.

Example 10 may include the method of example 1, wherein before employing the BIOS image file to perform BIOS flashing, the method further includes:

detecting a flash write signal.

Example 11 may include the method of example 1, wherein before employing the BIOS image file to perform BIOS flashing, the method further includes:

verifying that a BIOS flashing program has validity and completeness.

Example 12, a BIOS image file processing method, including:

receiving a BIOS image file obtaining request, the BIOS image file obtaining request carrying a second verification parameter;

obtaining a BIOS image file and generating a first file parameter of the BIOS image file;

based on the second verification parameter generating a first verification parameter; and sending the first file parameter, the first verification parameter, and the BIOS image file together to the data server, causing the data server to verify that the first verification parameter has validity, and verify, based on the first file parameter, that the BIOS image file has completeness.

Example 13 may include the method of example 12, wherein the BIOS image file obtaining request further carries a security certificate of the data server, and before obtaining a BIOS image file and generating a first file parameter of the BIOS image file, the method further includes:

verifying that the security certificate of the data server has validity.

Example 14 may include the method of example 12, wherein the BIOS image file obtaining request further carries BIOS image file version information, and obtaining the BIOS image file includes:

based on the BIOS image file version information, obtaining the BIOS image file.

Example 15 may include the method of example 14, wherein the BIOS image file version information and the second verification parameter carry a public key signature of the BIOS management server, and the method further includes:

based on a private key signature of the BIOS management server, verifying that the BIOS image file version information and the second verification parameter have validity.

Example 16 may include the method of example 12, wherein before obtaining the BIOS image file, the method further includes:

obtaining BIOS-related information provided by a BIOS vendor server, the BIOS-related information including at least one of vendor server information and BIOS image file version information; and after obtaining the BIOS image file, the method further includes:

based on the BIOS-related information, obtaining a required public key from multiple types of public keys of the BIOS vendor server, the BIOS image file carrying a signature generated by a private key corresponding to the source BIOS vendor server; and performing signature verification upon the BIOS image file employing the obtained public key.

Example 17 may include the method of example 16, wherein the BIOS-related information further includes a first file parameter of the BIOS image file, and the method further includes:

based on the first file parameter, verifying that the BIOS image file has completeness.

Example 18 may include the method of example 12, wherein obtaining a BIOS image file and generating a first file parameter of the BIOS image file includes:

generating the BIOS image file, and, based on the generated BIOS image file, generating a corresponding first file parameter.

Example 19 may include the method of example 18, wherein before generating the BIOS image file, and, based on the generated BIOS image file, generating a corresponding first file parameter, the method further includes:

verifying that a BIOS generating program has validity and completeness.

Example 20 may include the method of example 12, wherein after obtaining a BIOS image file and generating a first file parameter of the BIOS image file, the method further includes:

based on the private key of the BIOS management server, signing the BIOS image file and the first file parameter, causing the data server to, based on a public key of the BIOS management server, verify that the BIOS image file and the first file parameter have validity.

Example 21, a data processing method, includes:

obtaining a BIOS image file, the BIOS image file carrying a first verification parameter and a first file parameter;

determining that the first verification parameter complies with a preset rule; and based on the first file parameter, determining that the BIOS image file is not altered.

Example 22 may include the method of example 21, wherein after, based on the first file parameter, determining that the BIOS image file is not altered, the method further includes: employing the BIOS image file to perform BIOS flashing.

Example 23, a computing device, including memory, a processor and computer programs stored on the memory and runnable on the processor, characterized by the processors, while executing the computer programs, implementing one or more methods of the examples 1-22.

Example 24, a computer-readable storage medium, having stored thereon computer programs, characterized by the computer programs, while being executed by a processor, implementing one or more methods of the examples 1-22.

Although certain example embodiments herein have the objective of providing explanation and description, various alternatives and/or equivalent implementations or implementations which arrive at the same objectives by computation as illustrated and described by the example embodiments shall not be removed from the scope of implementation of the present disclosure. The present disclosure is intended to cover any modifications or changes to the example embodiments discussed in the present text. Therefore, it is clear that example embodiments described by the present text delineate the claims as well as their equivalents.

What is claimed is:

1. A method comprising:
    obtaining a BIOS image file, the BIOS image file carrying a first verification parameter and a first file parameter, validity of the first verification parameter being indicative of a procedure of obtaining the BIOS image file being secure and reliable;
    verifying that the first verification parameter has validity;
    verifying that the BIOS image file has completeness based on the first file parameter;
    performing BIOS flashing employing the BIOS image file verified as having completeness; and
    sending a BIOS image file obtaining request to a BIOS management server, the BIOS image file obtaining request carrying a second verification parameter and BIOS image file version information, the first verification parameter being generated based on the second verification parameter,
    wherein verifying that the first verification parameter has validity includes verifying that the first verification parameter has validity based on the second verification parameter.

2. The method of claim 1, wherein the first file parameter is generated based on the BIOS image file.

3. The method of claim 1, wherein the BIOS image file further carries a private key signature of a BIOS management server, and further comprising:
    verifying that the BIOS image file has validity based on a public key of the BIOS management server.

4. The method of claim 1, wherein the BIOS image file further carries a security certificate of a BIOS management server, and further comprising:
    verifying that the security certificate of the BIOS management server has validity.

5. The method of claim 1, wherein based on the first file parameter, verifying that the BIOS image file has completeness comprises:
    generating a second file parameter based on the BIOS image file; and
    verifying that the second file parameter and the first file parameter are consistent, wherein if consistent, the BIOS image file has completeness.

6. The method of claim 5, wherein the BIOS image file further carries a file parameter algorithm identifier, and generating second file parameter based on the BIOS image file comprises:
    generating the second file parameter based on the file parameter algorithm identifier and the BIOS image file.

7. The method of claim 1, further comprising, after performing BIOS flashing employing the BIOS image file:
    signing the first file parameter based on a private key of the data server; and
    storing the private key signature of the data server and the first file parameter.

8. The method of claim 7, further comprising:
    generating a third verification parameter based on the first verification parameter; and
    sending the third verification parameter and the first file parameter carrying the private key signature of the data server to the BIOS management server, to cause the BIOS management server to verify that the first verification parameter has validity based on the third verification parameter, and store the first file parameter carrying the private key signature of the data server.

9. The method of claim 1, further comprising, before performing BIOS flashing employing the BIOS image file:
    verifying that a BIOS flashing program has validity and completeness.

10. A method comprising:
    receiving a BIOS image file obtaining request, the BIOS image file obtaining request carrying a second verification parameter and BIOS image file version information;
    obtaining a BIOS image file and generating a first file parameter of the BIOS image file based on the BIOS image file version information;
    generating a first verification parameter based on the second verification parameter and verifying that the first verification parameter has validity based on the second verification parameter, validity of the first verification parameter being indicative of a procedure of obtaining the BIOS image file being secure and reliable; and sending the first file parameter, the first verification parameter, and the BIOS image file together to a data server, causing the data server to verify that the first verification parameter has validity, and verify that the BIOS image file has completeness based on the first file parameter.

11. The method of claim 10, wherein the BIOS image file obtaining request further carries a security certificate of the data server, and further comprising, before obtaining a BIOS image file and generating a first file parameter of the BIOS image file:

verifying that the security certificate of the data server has validity.

12. The method of claim 10, wherein the BIOS image file version information and the second verification parameter carry a public key signature of the BIOS management server, and further comprising:

verifying that the BIOS image file version information and the second verification parameter have validity based on a private key signature of the BIOS management server.

13. The method of claim 10, further comprising, before obtaining the BIOS image file:

obtaining BIOS-related information provided by a BIOS vendor server, the BIOS-related information including at least one of vendor server information and BIOS image file version information; and further comprising, after obtaining the BIOS image file:

obtaining a required public key from multiple types of public keys of the BIOS vendor server based on the BIOS-related information, the BIOS image file carrying a signature generated by a private key corresponding to the source BIOS vendor server; and performing signature verification upon the BIOS image file employing the obtained public key.

14. The method of claim 13, wherein the BIOS-related information further includes the first file parameter of the BIOS image file, and further comprising:

verifying that the BIOS image file has completeness based on the first file parameter.

15. The method of claim 10, further comprising, before generating the BIOS image file and generating a corresponding first file parameter based on the generated BIOS image file:

verifying that a BIOS generating program has validity and completeness.

16. The method of claim 10, further comprising, after obtaining a BIOS image file and generating the first file parameter of the BIOS image file:

signing the BIOS image file and the first file parameter based on the private key of the BIOS management server, causing the data server to verify that the BIOS image file and the first file parameter have validity based on a public key of the BIOS management server.

17. A method performed by a computing device comprising:

obtaining a BIOS image file, the BIOS image file carrying a first verification parameter and a first file parameter, the first verification parameter agreed upon in advance by a data server and a BIOS management server, validity of the first verification parameter being indicative of a procedure of obtaining the BIOS image file being secure and reliable;

verifying that the first verification parameter has validity by determining that the first verification parameter complies with a preset rule, the preset rule acquired in advance by the computing device for evaluating consistency of the first verification parameter;

determining that the BIOS image file is unaltered based on the first file parameter;

performing BIOS flashing employing the BIOS image file determined as unaltered; and sending a BIOS image file obtaining request to the BIOS management server, the BIOS image file obtaining request carrying a second verification parameter and BIOS image file version information, the first verification parameter being generated based on the second verification parameter, wherein verifying that the first verification parameter has validity further includes verifying that the first verification parameter has validity based on the second verification parameter.

* * * * *